US005659693A

United States Patent [19]
Hansen et al.

[11] Patent Number: 5,659,693
[45] Date of Patent: *Aug. 19, 1997

[54] USER INTERFACE WITH INDIVIDUALLY CONFIGURABLE PANEL INTERFACE FOR USE IN A COMPUTER SYSTEM

[75] Inventors: George A. Hansen, Walnut Creek; Robert C. Robnett, San Jose; Lawrence Lozares, Sunnyvale; Paul A. Mernyk, Palo Alto, all of Calif.

[73] Assignee: Starfish Software, Inc., Scotts Valley, Calif.

[*] Notice: The term of this patent shall not extend beyond the expiration date of Pat. No. 5,602,997.

[21] Appl. No.: 478,889

[22] Filed: Jun. 7, 1995

Related U.S. Application Data

[63] Continuation of Ser. No. 85,342, Jun. 30, 1993, abandoned, which is a continuation-in-part of Ser. No. 936,692, Aug. 27, 1992, abandoned.

[51] Int. Cl.⁶ .................................................. G06F 3/14
[52] U.S. Cl. ............................................ 395/333; 395/353
[58] Field of Search ........................... 395/326, 333–335, 395/339–348, 352–354, 155, 157, 159, 161

[56] References Cited

U.S. PATENT DOCUMENTS

| | | | |
|---|---|---|---|
| 4,819,191 | 4/1989 | Scully et al. | 395/329 |
| 4,937,743 | 6/1990 | Rassman et al. | 364/705.08 |
| 5,222,209 | 6/1993 | Murata et al. | 395/346 |
| 5,295,062 | 3/1994 | Fukushima | 395/349 X |
| 5,301,336 | 4/1994 | Kodosky et al. | 395/800 |
| 5,323,314 | 6/1994 | Baber et al. | 395/349 X |
| 5,425,140 | 6/1995 | Bloomfield et al. | 395/329 |

OTHER PUBLICATIONS

Microsoft, Windows 3.0 User Manual, 1990 pp. 17–22, 42–49, 52–56, 79, 84–85, 148–149, 177–179, 370–409.
Bermant, Windows Memory Management, Personal Workstation, Apr. 1991 pp. 72 to 74.
Willnott, Tips Tricks & Hints for Windows 3.0, PC Magazine Feb. 26, 1991, pp. 105–116.
Exemplory Screen Print from the "SYSEDIT" Program Referred to in Willmott (Reference R) –1 page.
Borland, Quattro Pro User Manual, 1990, pp. 156–157, 166–167, 378–381.
Exemplary Printouts from Quattro Pro Showing Both Scaling and Non–Scaling Displays (3 pages).
Microsoft, Windows 3.0 User Maul, 1990, pp. 145–147.
Amish Utilities User's Guide, Amish Software, Inc., 541 Cowper Street, Suite A, Palo Alto, CA 94301, 1992, pp. 19–24.
WinMaster User's Guide, PC–Kwik Corporation, 15100 SW Koll Parkway, Beaverton, OR 97006, pp. 28–49.
Rooms for Windows from XSoft User Guide, Xerox Corporation, 3400 Hillview Avenue, Palo Alto, California 94303, Mar. 1, 1992, pp. 18–42.
Wide Angle, Attitash Software, Inc., 20 Trafalgar Square, Nashua, New Hampshire 03063, pp. 3-1 –4-13.
Using Norton Desktop for Windows, Symantec, pp. 18-3 –18-7.
HOTWin Version 2.0A, Abacist Software Company, 1992, pp. 4-1 –5-1.

*Primary Examiner*—Anton W. Fetting
*Attorney, Agent, or Firm*—John A. Smart

[57] ABSTRACT

A user interface has a main module and a plurality of panel modules. The main module presents the user interface on the display screen to a user. The plurality of panel modules are in communication with the main module. Each panel module presents a panel interface on the display screen to the user. Each panel module is individually configurable and each panel module is configurable as part of the user interface presented by the main module. In the preferred embodiment, the displayed user interface and individual panel interfaces may be varied in size in two dimensions. The user interface can be displayed with a vertical or horizontal orientation. Also, a calendar and resource gauge with unique features are included among the panel interfaces.

7 Claims, 37 Drawing Sheets

USER INTERFACE WITH INDIVIDUALLY CONFIGURABLE PANEL INTERFACE FOR USE IN A COMPUTER SYSTEM

CROSS REFERENCE TO RELATED APPLICATION

This is a File Wrapper Continuation patent application of Ser. No. 08/085,342 filed Jun. 30, 1993, now abandoned which is a continuation-in-part application of an application previously filed on Aug. 27, 1992 as application Ser. No. 07/936,692, abandoned.

BACKGROUND

The present invention concerns a user interface with individually configurable panel interfaces for use in a computer system.

In a computer systems such as personal computers, there is a continual search to provide a user simple and intuitive interfaces to computer applications and resources. For example, many personal computers use the Microsoft Windows operating system, available from Microsoft Corporation having a business address of One Microsoft Way, Redmond, Wash. 98052.

Various utilities have been designed to run with the Microsoft Windows operating system. These include, for example, Amish Utilities available from Amish Software, Inc., having a business address of 541 Cowper Street, Suite A, Palo Alto, Calif. 94301, the KwikInfo utility available from PC-Kwik Corporation having a business address of 15100 SW Koll Parkway, Beaverton, Oreg. 97006, the PowerLauncher utility available from hDC Computer Corporation, having a business address of 6742 185th Ave NE, Redmond Wash. 98052, the SideBar utility available from Paper Software, Inc., having a business address of P.O. Box 567 New Paltz, N.Y. 12561, the Rooms for Windows utility available from Xerox Corporation, XSoft Production Education, having a business address of 3400 Hillview Avenue, Palo Alto, Calif. 94303, the Wide Angle utility available from Attitash, having a business address of 20 Trafalgar Square, Nashua, N.H. 03063, the Squeegee utility available from ICOM Simulations, Inc., having a business address of 648, S. Wheeling Road, Wheeling, Ill. 60090, the SYSTEM INFO utility available from Symantec, as part of the Norton Desktop for Windows, and the Gallery View utility available from Abacist Software Company. The above-described utilities variously implement functionality for launching programs, printing, viewing screens and showing virtual screens.

SUMMARY OF THE INVENTION

In accordance with the preferred embodiment of the present invention, a user interface is presented. The user interface has a main module and a plurality of panel modules. The main module presents the user interface on the display screen to a user. The plurality of panel modules are in communication with the main module. Each panel module presents a panel interface on the display screen to the user. Each panel module is individually configurable and each panel module is configurable as part of the user interface presented by the main module.

In the preferred embodiment panel interfaces are displayed across a computer screen. Upon a user selecting to expand a size of the displayed user interface shell in a first dimension, each displayed panel interface is expanded in the first dimension. At least one panel interface increases the number of buttons displayed. At least one panel interface proportionally expands an object displayed. Upon the user selecting to shrink the size of the displayed user interface shell in the first dimension, shrinking each displayed panel interface in the first dimension. At least one panel interface decreases the number of buttons displayed. At least one panel interface proportionally shrinks an object displayed. Upon the user selecting to expand a size of the displayed user interface shell in a second dimension different from the first dimension, each displayed panel interface is expanded in the second dimension. At least one panel interface increases the number of buttons displayed. At least one panel interface, proportionally expands an object displayed. Upon the user shrinking the displayed user interface shell in the second dimension, each panel interface is shrunk in the second dimension. At least one panel interface decreases the number of buttons displayed. At least one panel interface proportionally shrinks an object displayed.

Also in the preferred embodiment, the plurality of panel interfaces are displayed in a horizontal row within the user interface shell. Upon a user selecting a vertical orientation, the plurality of panel interfaces are displayed in a vertical column within the user interface shell. Upon a user selecting a horizontal orientation, displaying the plurality of panel interfaces in the horizontal row within the user interface shell.

Also in the preferred embodiment, a window is displayed for an application. Upon a user selecting a first user defined key, the user interface shell is displayed in front of the window for the application. Upon the user again selecting the first user defined key, the window for the application is displayed in front of the user interface shell. Likewise, upon the user selecting a first sequence including a mouse button, the user interface shell is displayed in front of the window for the application. Upon the user again selecting the first sequence, the window for the application is displayed in front of the user interface shell.

Additionally in the preferred embodiment, upon a user selecting a customize option for the user interface shell, a rollodex display is displayed. The rollodex display includes a plurality of tabs and a display card for a selected tab. Upon the user selecting a new tab from the plurality of tabs, a new display card is displayed for the new tab. One display card includes, for example, selection boxes which allow user selection of a font type and a font size for use in the display of the user interface shell. Another display card includes a selection box which allows user selection of a color scheme for use in the display of the user interface shell.

In one embodiment, a calendar is displayed within a first panel interface. The number of row of entries displayed within the calendar are varied based on the displayed size of the first panel interface. Additionally, upon a user selecting a recurring alarm to recur at a particular time each week, dates on the calendar on which the recurring alarm will occur are highlighted. The recurring alarm is executed at the particular time.

Another panel interface in the preferred embodiment indicates available computer resources. The displayed available computer resources include available memory in RAM using a gauge. Upon a user selecting a caption bar option, available computer resources is displayed using a caption bar. Upon the user selecting a bar graph option, available computer resources is displayed using a bar graph. An indication of an amount of memory available on hard disk is included in the preferred embodiment. Upon the user selecting to display the user interface in minimized icon form, an icon which displays information within the icon is displayed. The information indicates available computer resources.

DESCRIPTION OF THE PREFERRED EMBODIMENT

Figure 1:
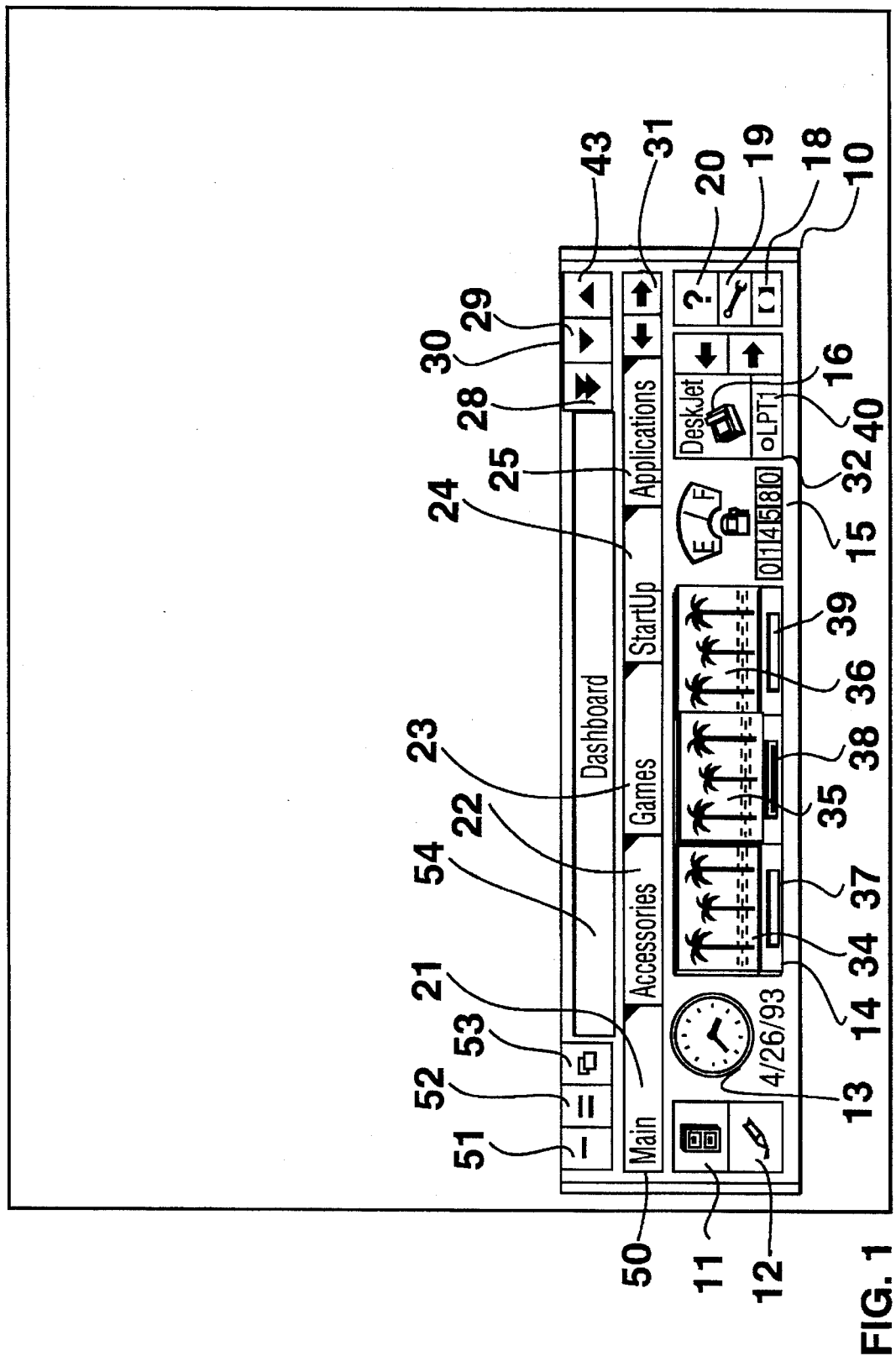
FIG. 1 shows a dashboard interface, in accordance with the preferred embodiment of the present invention.

FIG. 1 shows a graphic representation of an interface in accordance with the preferred embodiment of present invention. A computer "dashboard" interface 10 is placed on a computer screen, for example, in an unused region near the bottom of the screen. In the preferred embodiment, the default position of dashboard interface 10 can be anywhere on the computer screen. For information on computer dashboard interfaces, see co-pending U.S. patent application Ser. No. 08/079,720, filed Jun. 18, 1993, by Claudia Carpenter, George A. Hansen, Beatrice M. Y. Lain, Lawrence Lozares, Krisztina Mako, Patti A. Mernyk, and Robert Chris Robnett for USER INTERFACE WITH INDIVIDUALLY CONFIGURABLE PANEL INTERFACES FOR USE IN A COMPUTER SYSTEM, which is hereby incorporated by reference.

As shown in FIG. 1, dashboard interface 10 includes various panels. For example, FIG. 1 shows a quick launch panel which includes a quick launch button 11, a quick launch button 12, an alarm clock panel 13, an extended screens display panel 14, a resource panel 15 and a printer manager panel 32. Additionally, there is shown an about button 18, a customize button 19, a help button 20, a maximize button 43, a minimize button 29, a show/hide program menu button 28, a title bar 54, a system menu button 51, a task menu button 52, a layout menu button 53 and a program menu panel 50. Printer manager panel 32 includes a first printer button 16 and a first default printer indicator button 40. Selection of the default printer indicator button under a printer icon results in that printer becoming the default printer. An area within the default printer indicator button for the selected default printer is highlighted indicating the default printer to the computer user.

Extended screens display panel 14 includes a miniprogram window 34, a mini-program window 35, a mini-program window 36, a selection bar 37, a selection bar 38 and a selection bar 39. Program menu panel 50 includes a program group button 21, a program group button 22, a program group button 23, a program group button 24 and a program group button 25. A shift button 30 is used to shift group tabs in program menu 50 to the left. A shift button 31 is used to shift group tabs in program menu 50 to the right.

A program from program menu panel 50 may be launched by first selecting the program group button. All of the programs within that group will then be displayed. A listed program may then be selected to run. Also, the group window may be opened to display all programs as icons.

Figure 2:
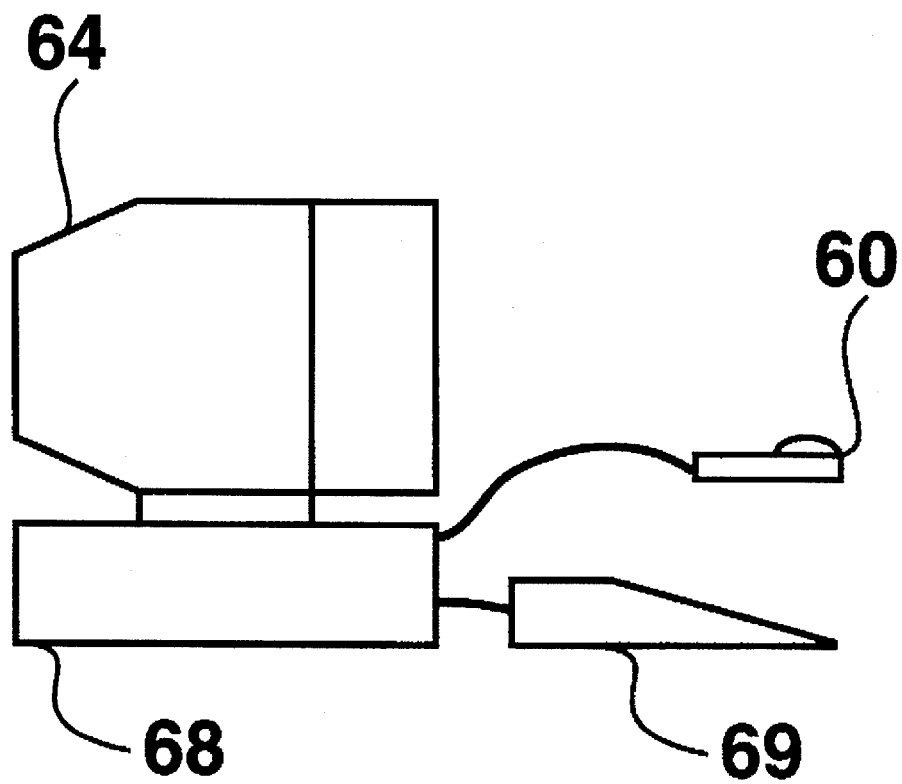
FIG. 2 shows a computing system which runs the dashboard interface shown in FIG. 1, in accordance with the preferred embodiment of the present invention.
Figure 3:
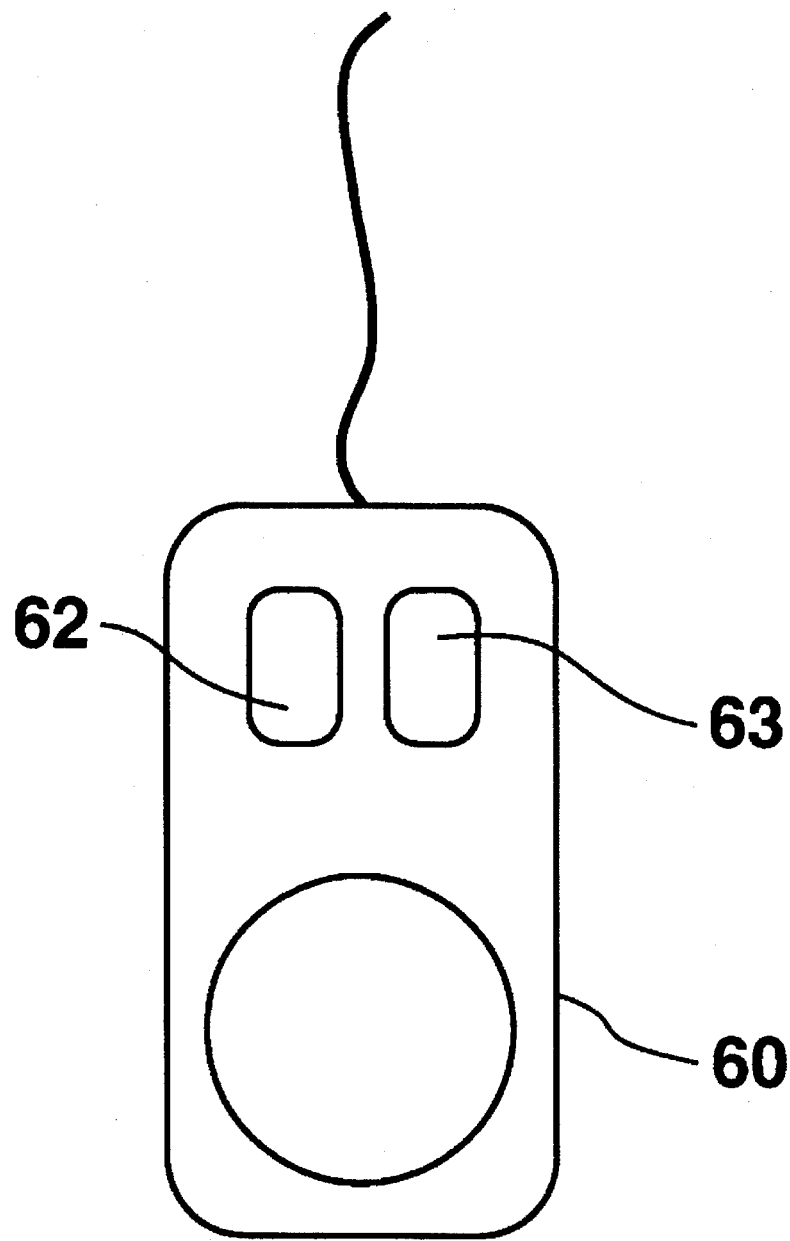
FIG. 3 shows a mouse utilized in the computing system shown in FIG. 2, in accordance with the preferred embodiment of the present invention.

FIG. 2 shows a block diagram of a computer system which generates and displays dashboard interface 10. A computer 68 controls a monitor 64. A keyboard 69 and a mouse 60 are utilized to interface with the computer system. FIG. 3 shows mouse 60 to include a button 62 and a button 63.

A mouse 60 and a cursor 56 may be used to re-size dashboard interface 10. To reduce the size of dashboard interface 10 in the vertical direction, cursor 56 is placed over the top or bottom border of dashboard interface 10 and button 62 on mouse 60 is depressed. Movements of mouse 60 may then be used to increase or decrease the size of dashboard interface 10 in the vertical direction. To reduce the size of dashboard interface 10 in the horizontal direction, cursor 56 is placed over one of the side borders of dashboard interface 10 and button 62 on mouse 60 is depressed. Movements of mouse 60 may then be used to increase or decrease the size of dashboard interface 10 in the horizontal direction.

Figure 4:
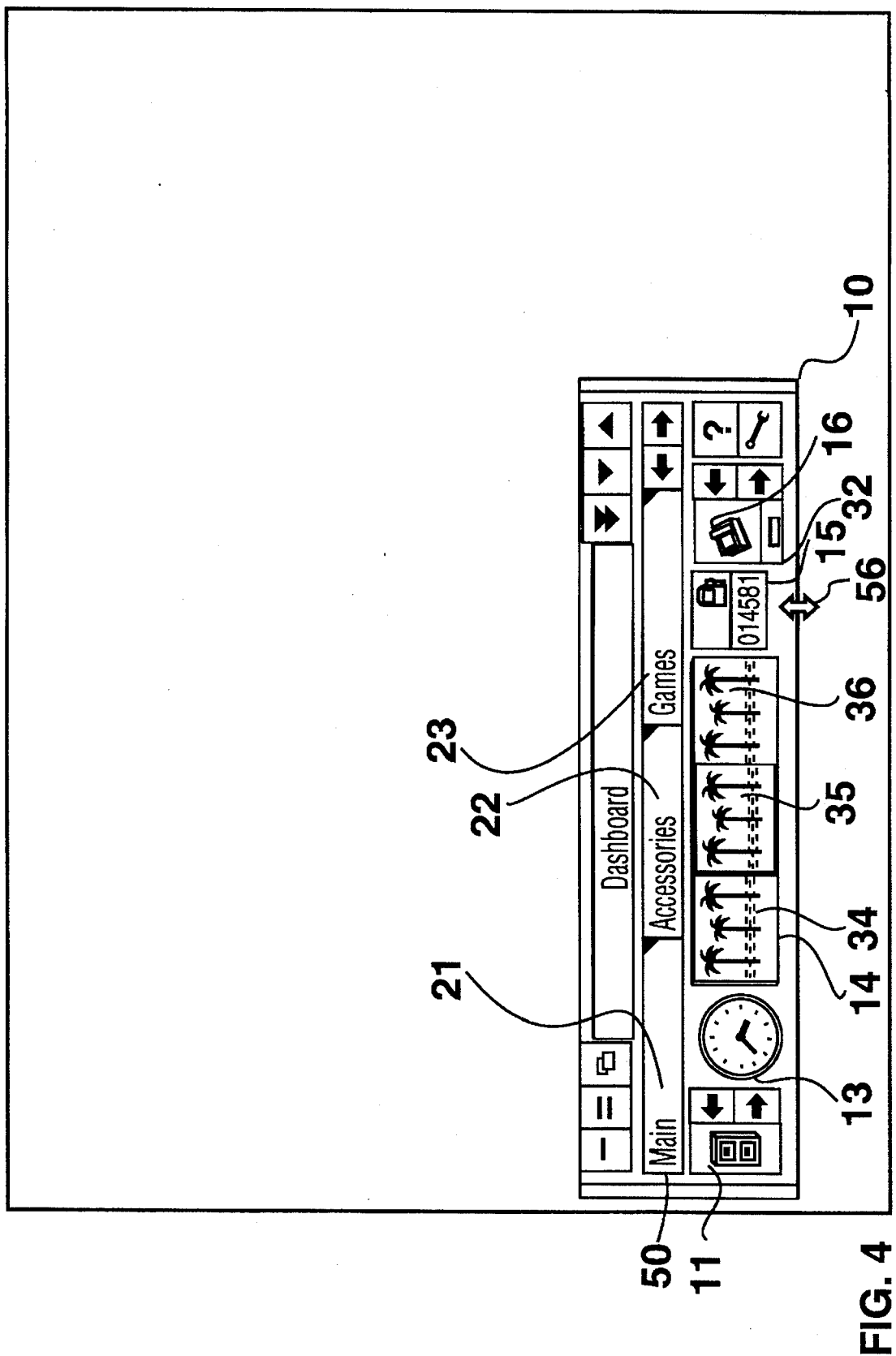
FIGS. 4 through 37 show computer screens which illustrate implementation of a dashboard interface in accordance with the preferred embodiment of the present invention.

FIG. 4 shows the size of dashboard interface 10 reduced significantly. When dashboard interface 10 is reduced, the size of individual panels also are reduced. For example, in FIG. 4, the quick launch panel is reduce in size so that only quick launch button 11 is shown. Each of the miniprogram windows 34, 35 and 36 within extended screens display panel 14 is reduced in size. Also, selection bar 37, selection bar 38 and selection bar 39 no longer appear. The date for alarm clock panel 13 is removed. The display for resource panel 15 is also changed. The labeling for the printer within the first printer button is removed. Also, only program group button 21, program group button 22 and program group button 23 remain in program menu panel 50.

Figure 5:
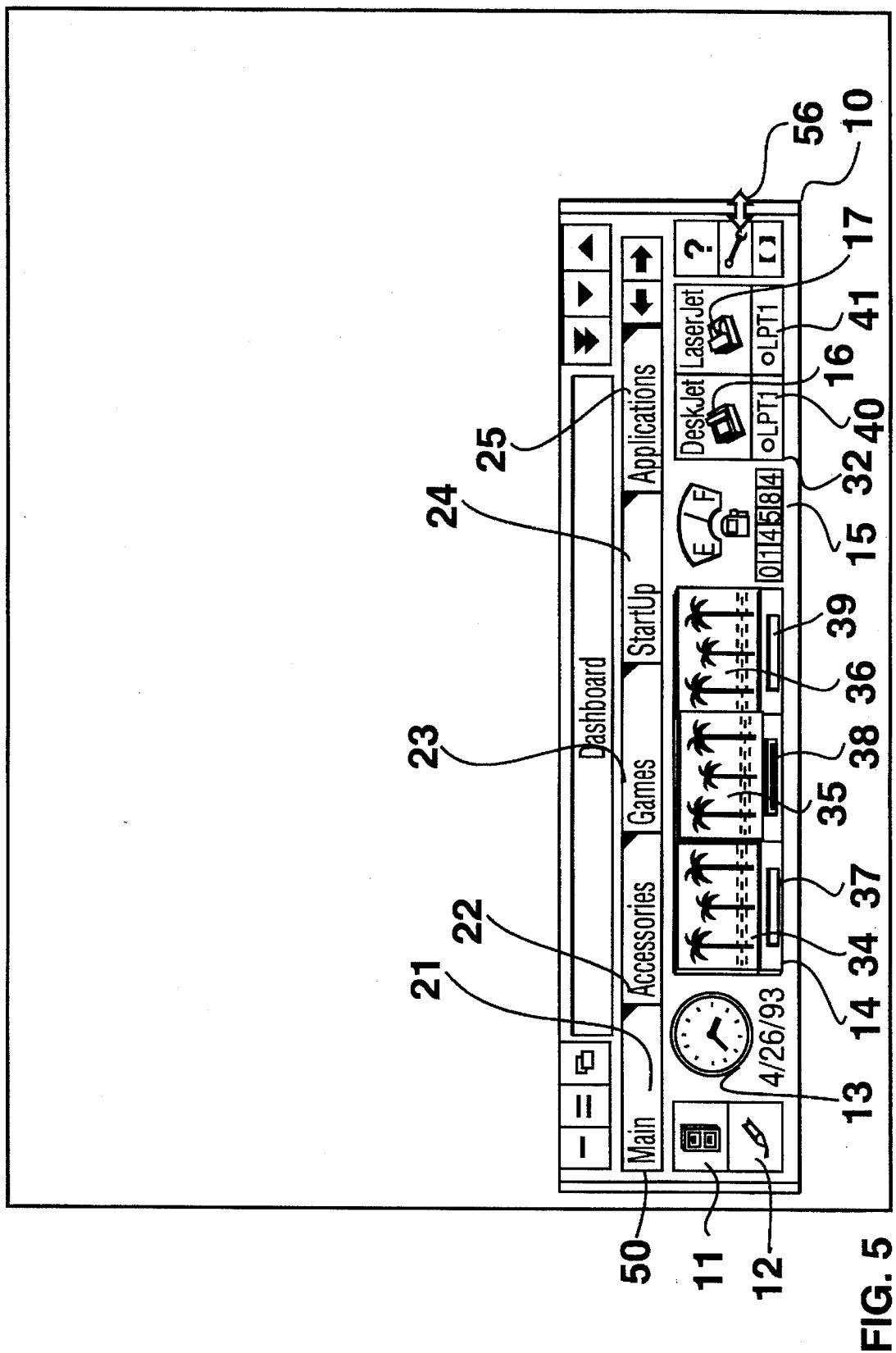

FIG. 5 shows the result when cursor 56 is used to restore dashboard interface 10 to full size. In FIG. 5, because of the expanded size of dashboard interface 10, printer manager panel 32 is shown to include a second printer button 17 and a second default printer indicator button 41 in addition to first printer button 16 and first default printer indicator button 40.

Figure 6:
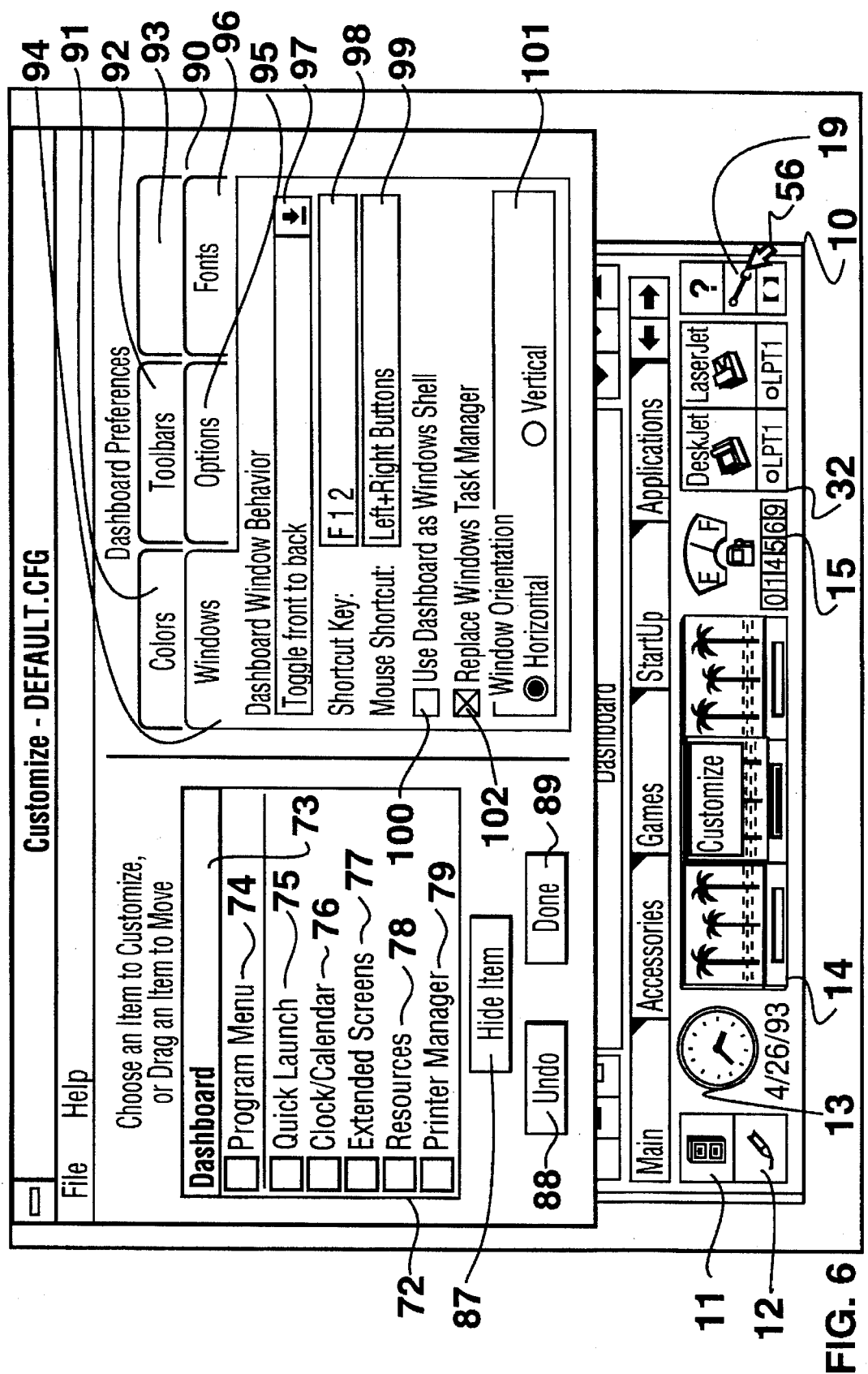

Using cursor 56 and mouse 60 to select customize button 19 results in a customize window 71 appearing, as shown in FIG. 6. Within customize window 71, customize menu 72 lists items within dashboard interface 10. These include a listing 73 for dashboard interface 10, a listing 74 for the program menu, a listing 75 for Quick launch, a listing 76 for alarm clock 13, a listing 77 for extended screens display 14, a listing 78 for resource gauge 15 and a listing 79 for printer manager 32. Also shown are a hide/show button 87, an undo button 88 and a done button 89.

In FIG. 6, dashboard listing 73 is highlighted. Therefore, a dashboard preferences window is shown. In a rollodex 90, one of tabs 91, 92, 94, 95 or 96 may be selected to show a corresponding display associated with the selected tab. For example, in FIG. 6, windows tab 94 has been selected. In a box 98, a shortcut key is specified. In a box 99, a mouse shortcut is specified. In a box 97, it is shown what will happen when the short cut key is selected or when the mouse shortcut is performed. Currently, box 97 shows that the dashboard interface will toggle between going to the front of all other windows on the display and going to the back of all other windows on the display. Another possibility that may be selected is that the dashboard interface will always go to the front of all other windows on the display when the short cut key is selected or when the mouse shortcut is performed. Box 100 is selected when dashboard interface 10 is to be used as a Windows shell. Box 102 is selected when a separate dashboard task manager replaces the Windows task manager. A box 101 is used to select whether dashboard interface 10 has a horizontal or a vertical orientation.

Figure 7:
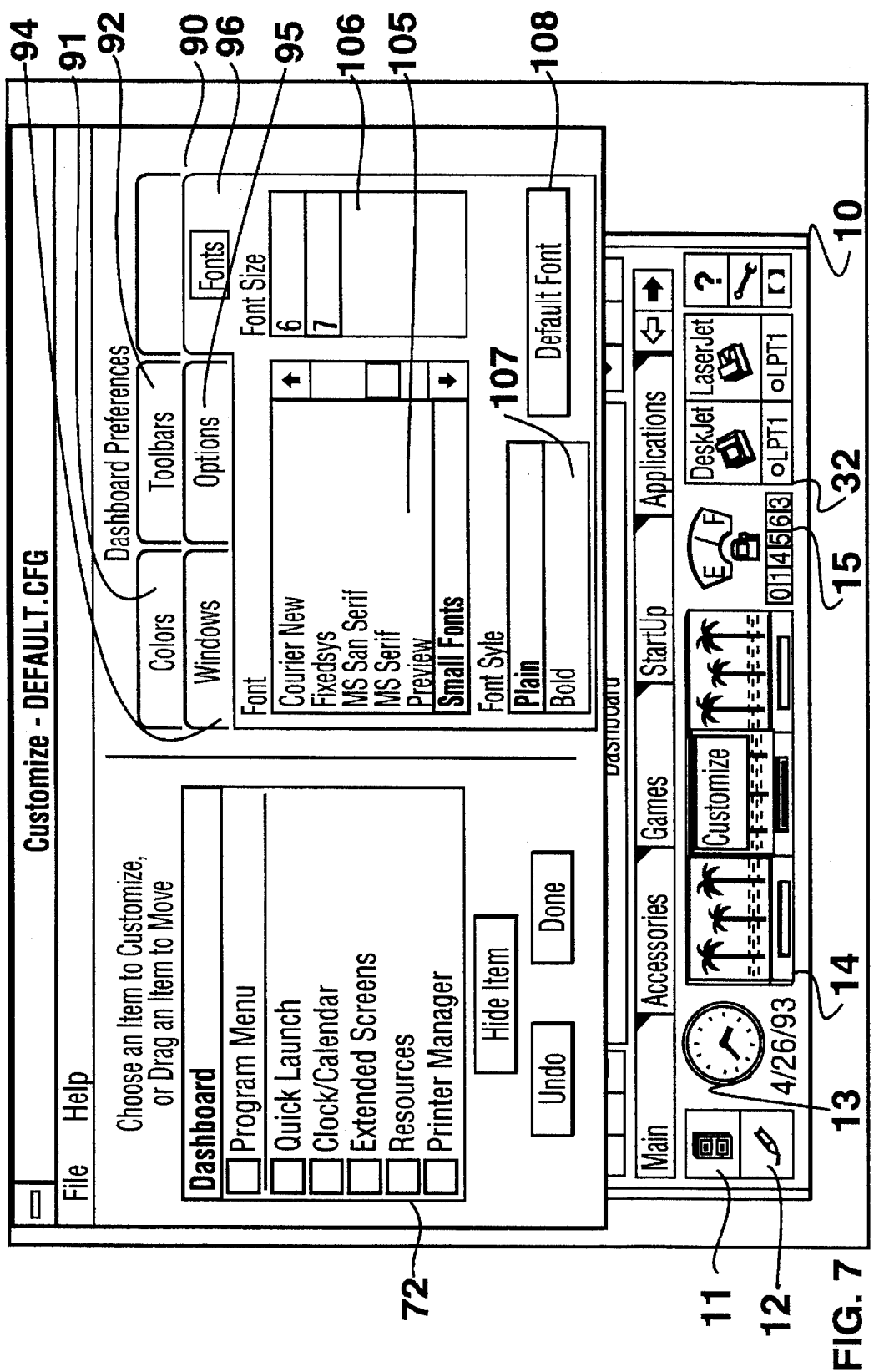

In FIG. 7, fonts tab 93 has been selected. In a box 105, a font type may be selected. In a box 106, a font size may be selected. In a box 107, a font style may be selected. Also shown is a default font button 108.

Figure 8:
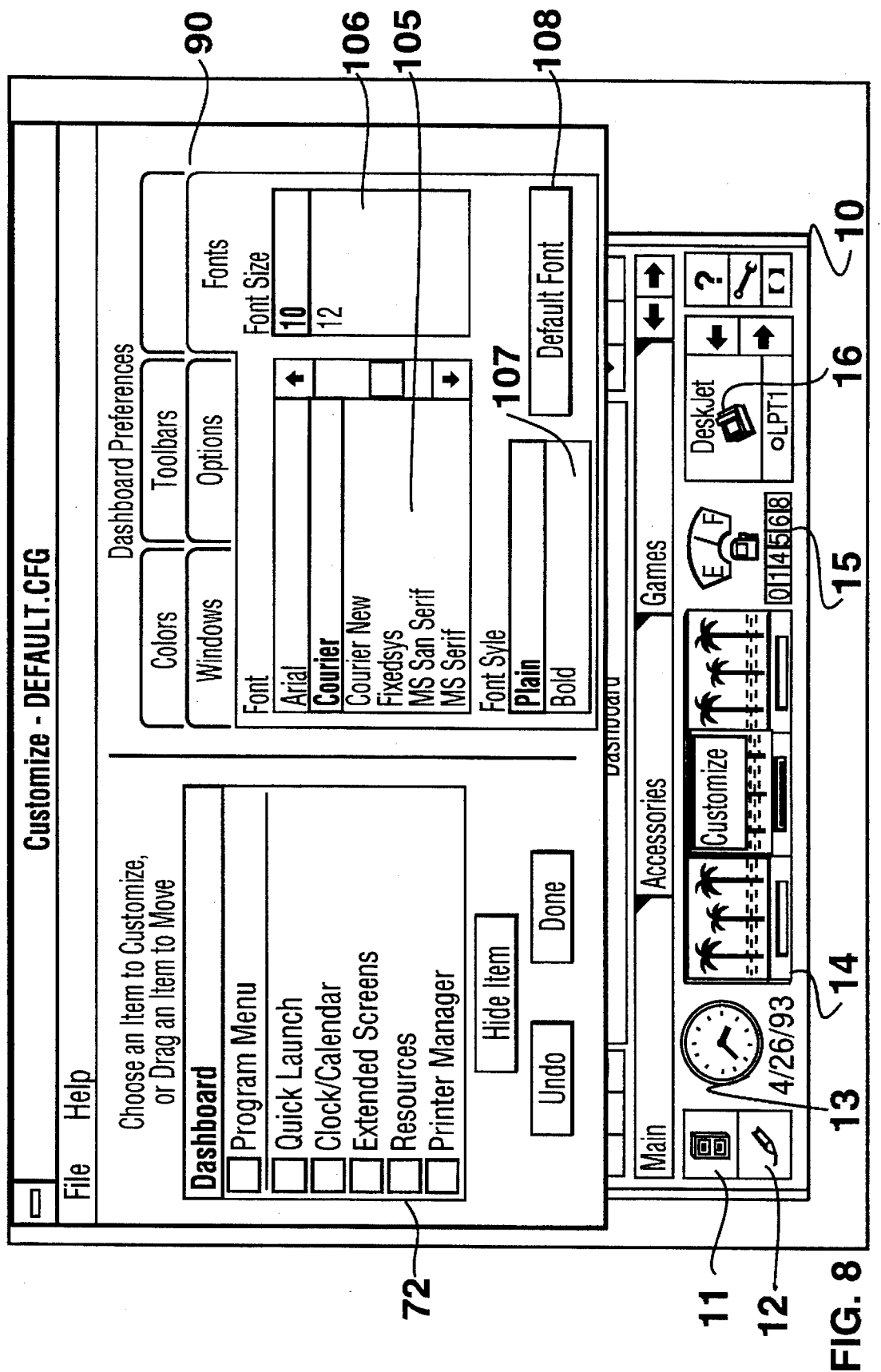

In FIG. 8, Courier is selected in box 105 and size "10" is selected in box 106. The result is shown in dashboard interface 10 where the lettering is now shown to be "Courier 10".

Figure 9:
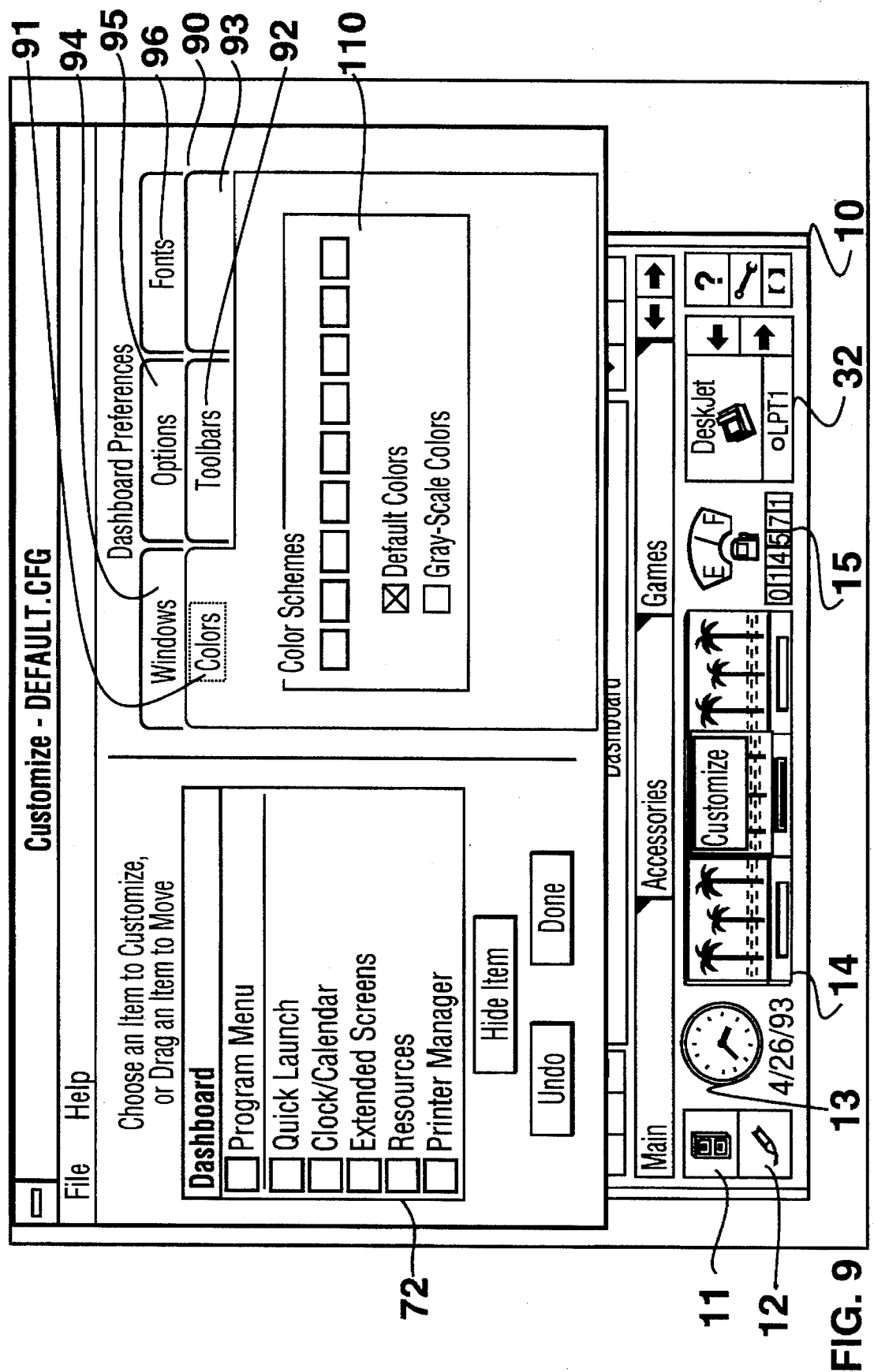
Figure 10:
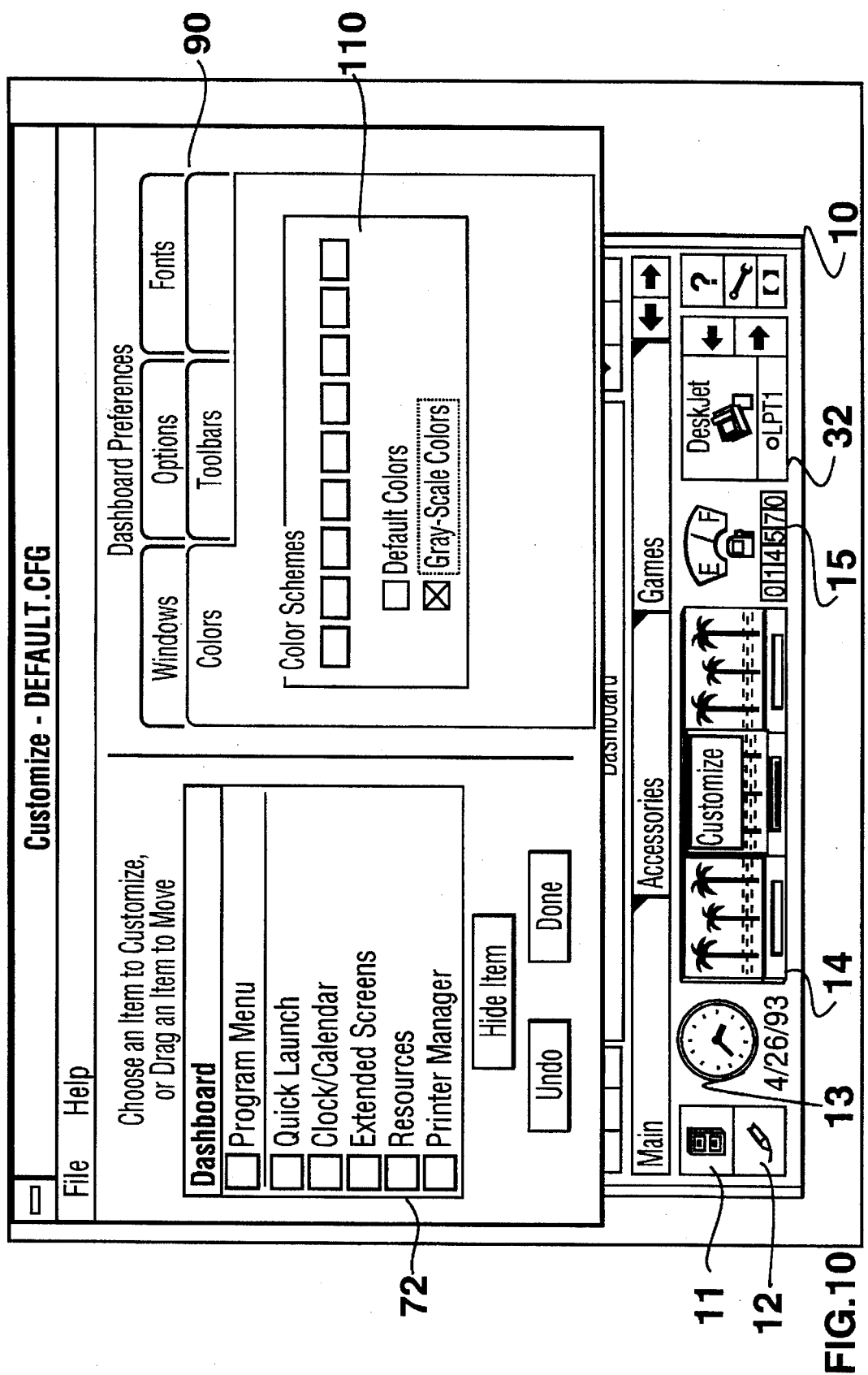

In FIG. 9, colors tab 91 has been selected. In a box 110, a row of boxes are displayed which each show a color option which can be displayed by dashboard interface 110. In FIG. 10, the box labeled "Gray-Scale Colors" is selected.

Figure 11:
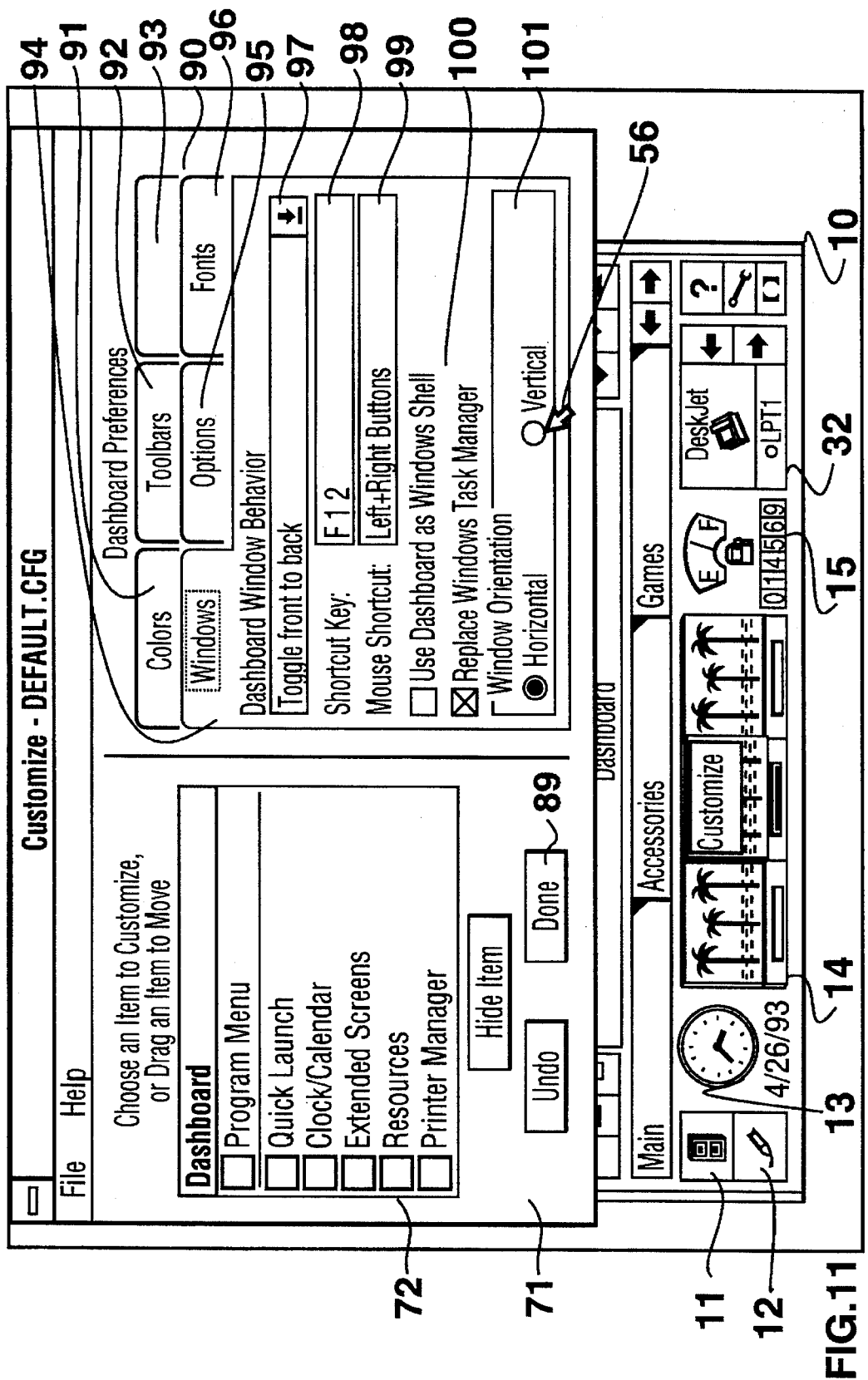
Figure 12:
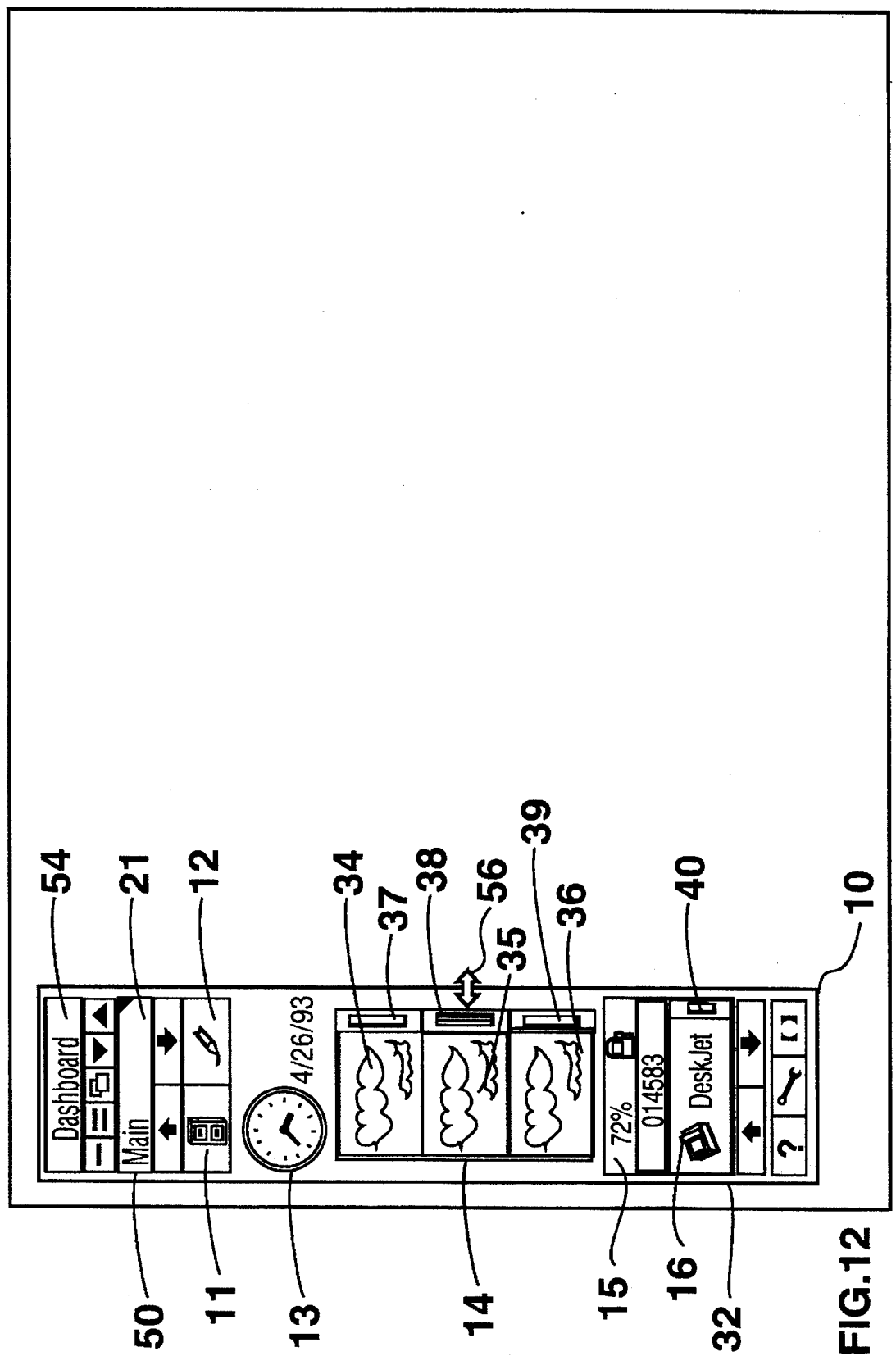
Figure 13:
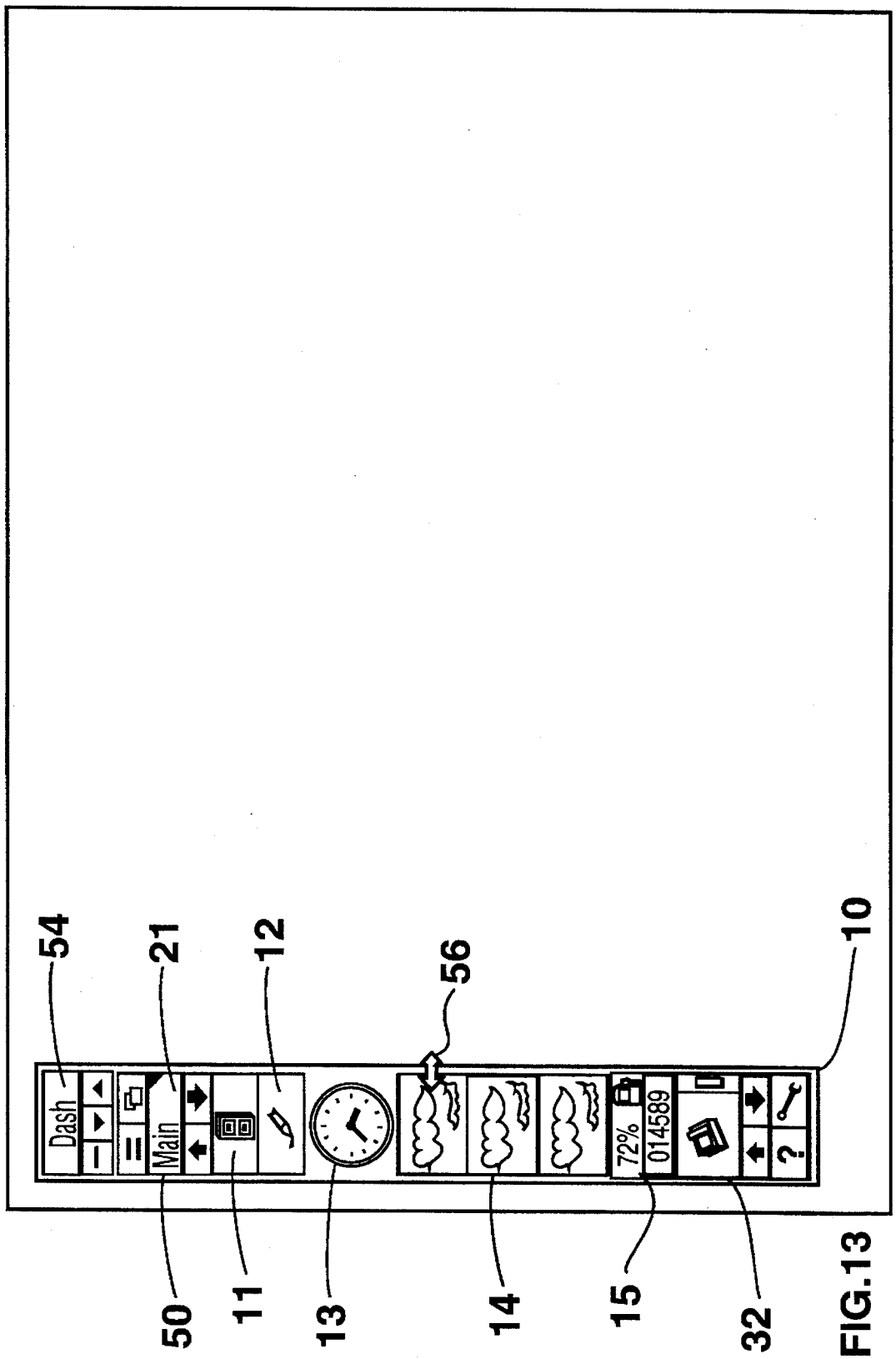

In FIG. 11, windows tab 94 is again selected. Cursor 56 and mouse 60 are then used to select vertical orientation from box 101. The result, shown in FIG. 12 after having closed customizing window 71, is that dashboard interface 10 is now oriented in a vertical direction. Dashboard interface 10 may still be sized using cursor 56. For example, In FIG. 13, the width of dashboard has been reduced. This results in the size of individual panels being reduced in width. For example, in FIG. 13, the quick launch panel is reduce in width so that quick launch button 11 are shown vertically oriented. Also, each of the miniprogram windows 34, 35 and 36 within extended screens display panel 14 are reduced in width. Further, selection bar 37, selection bar 38 and selection bar 39 no longer appear. The date for alarm clock panel 13 is removed. The width of the display for resource panel 15 is reduced. The labeling for the printer within the first printer button is removed. Also, only program group button 21 remains in program menu panel 50.

Figure 14:
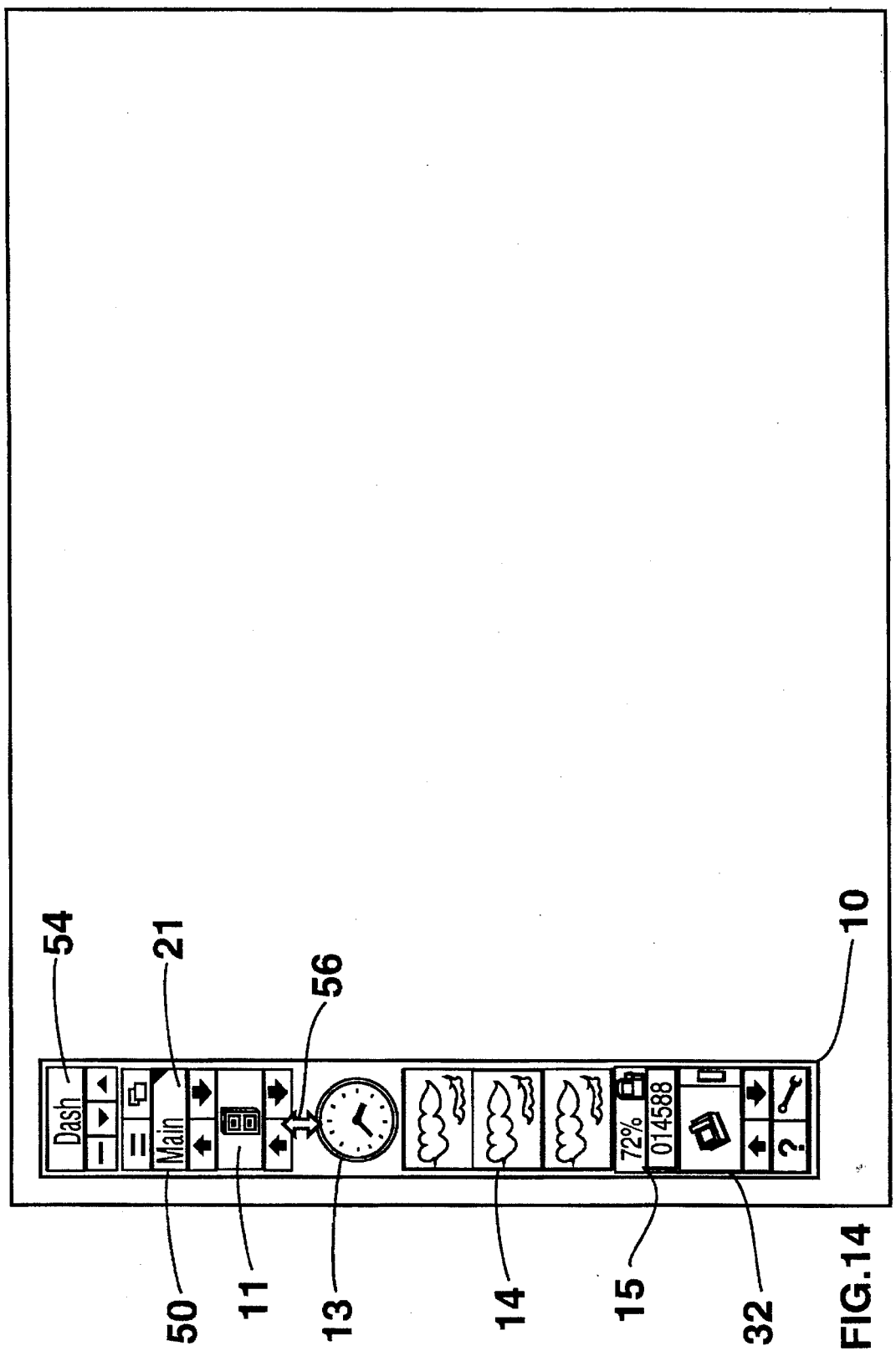
Figure 15:
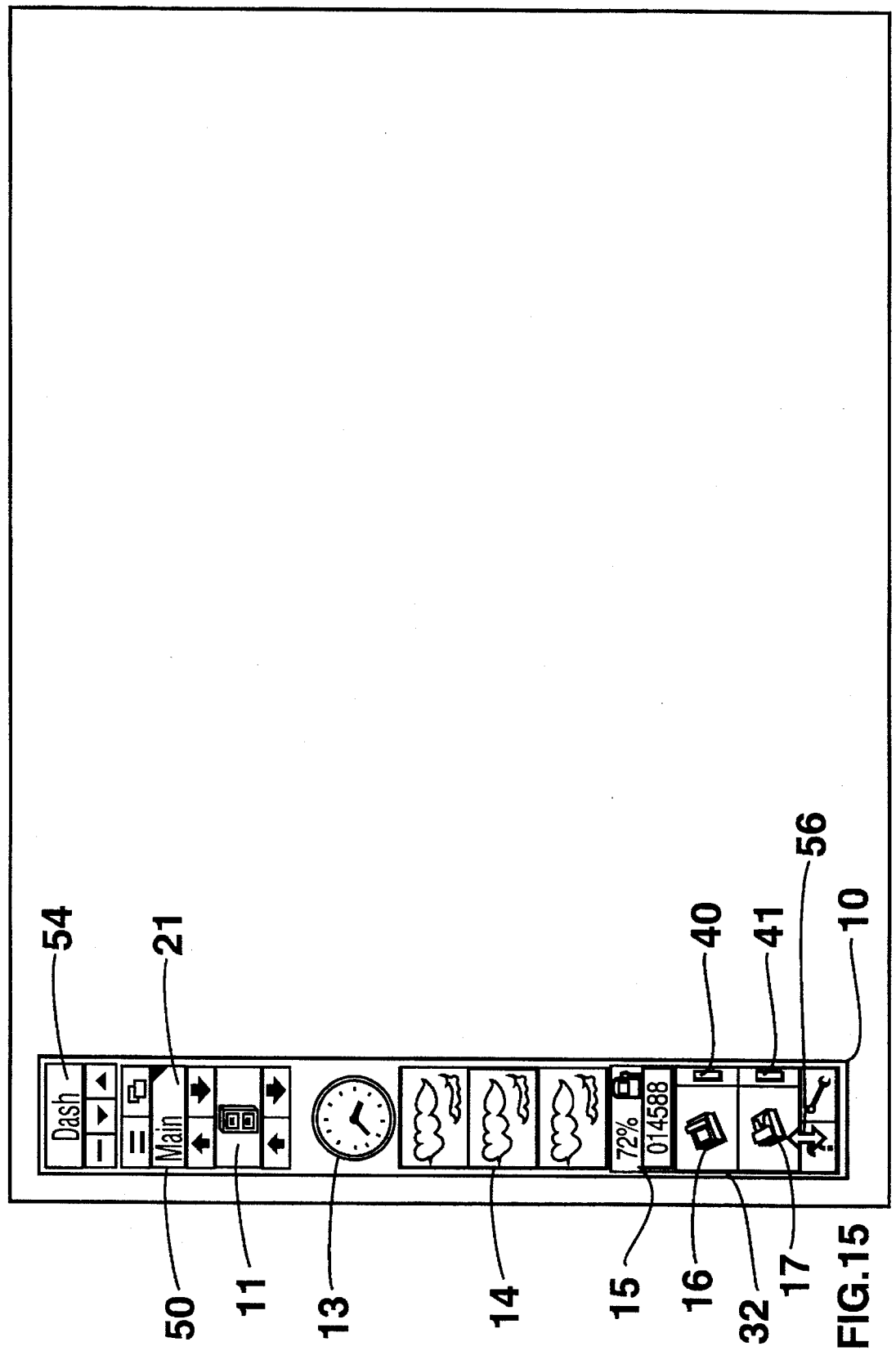

In the preferred embodiment of the present invention, panels within dashboard interface 10 may be individually sized. This is done by placing cursor 56 over the border of a panel and pressing the "Shift" key on keyboard 69. A gray boarder then appears around the panel. By placing cursor 56 over this gray border and depressing button 62, it is possible to use mouse 60 to individually size the panel. For example, in FIG. 14, cursor 56 and mouse 60 have been used to reduce the vertical size of the quick launch panel. Upon reduction of the vertical size of the quick launch panel, quick launch button 12 is no longer shown. In FIG. 15, cursor 56 and mouse 60 have been used to enlarge the vertical size of printer manager panel 32. Upon enlarging of the vertical size of printer manager panel 32, second printer button 17 and second default printer indicator button 41 are displayed.

Figure 16:
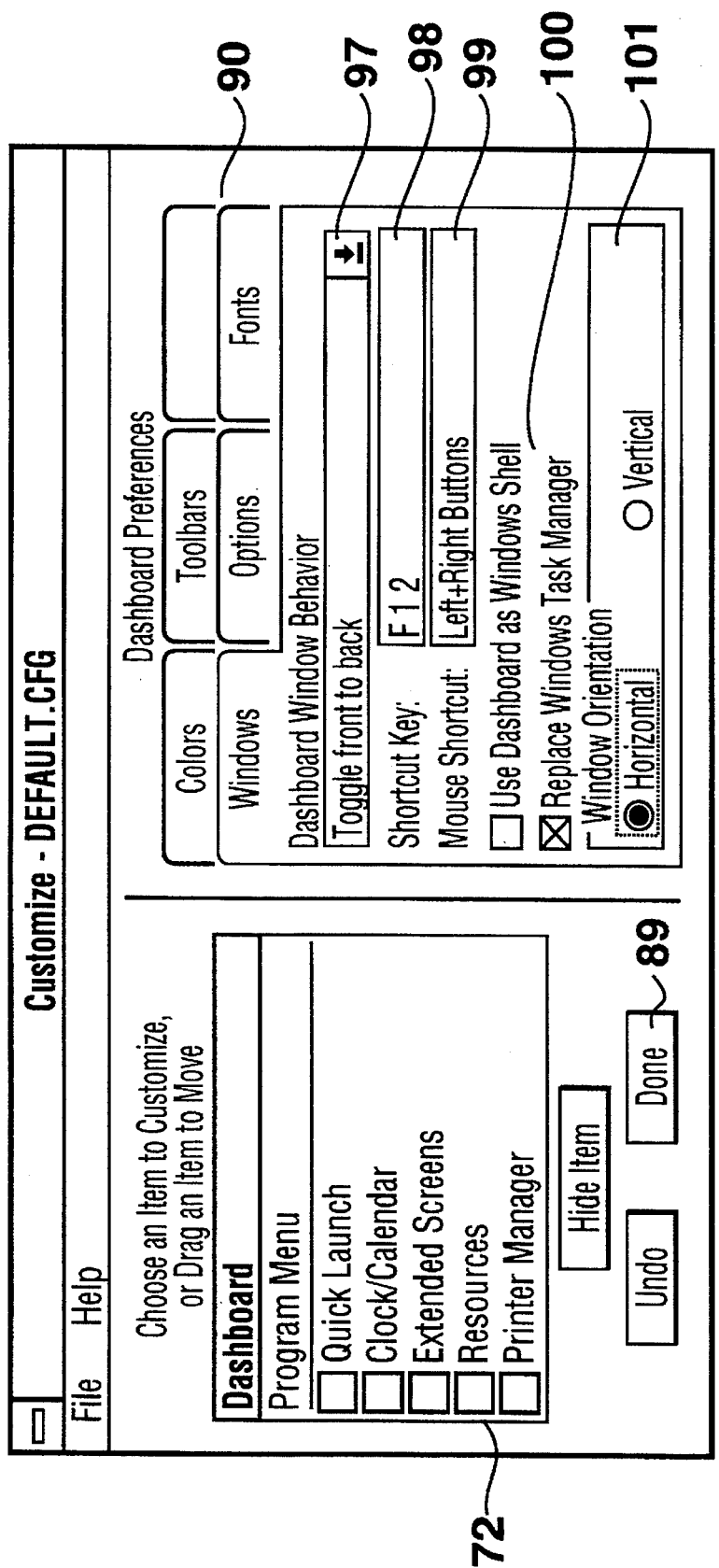

In FIG. 16, cursor 56 and mouse 60 have again been used to select customize button 19 resulting in customize window 71 re-appearing. Windows tab 94 is again selected. Cursor 56 and mouse 60 are then used to select horizontal orientation from box 101. Also, as shown in box 98 the shortcut key "F12" is specified. In box 99, the mouse shortcut "Left+Right Buttons" is specified. Box 97 shows that the dashboard interface will toggle between going to the front of all other windows on the display and going to the back of all other windows on the display. The toggling is illustrated as follows.

Figure 17:
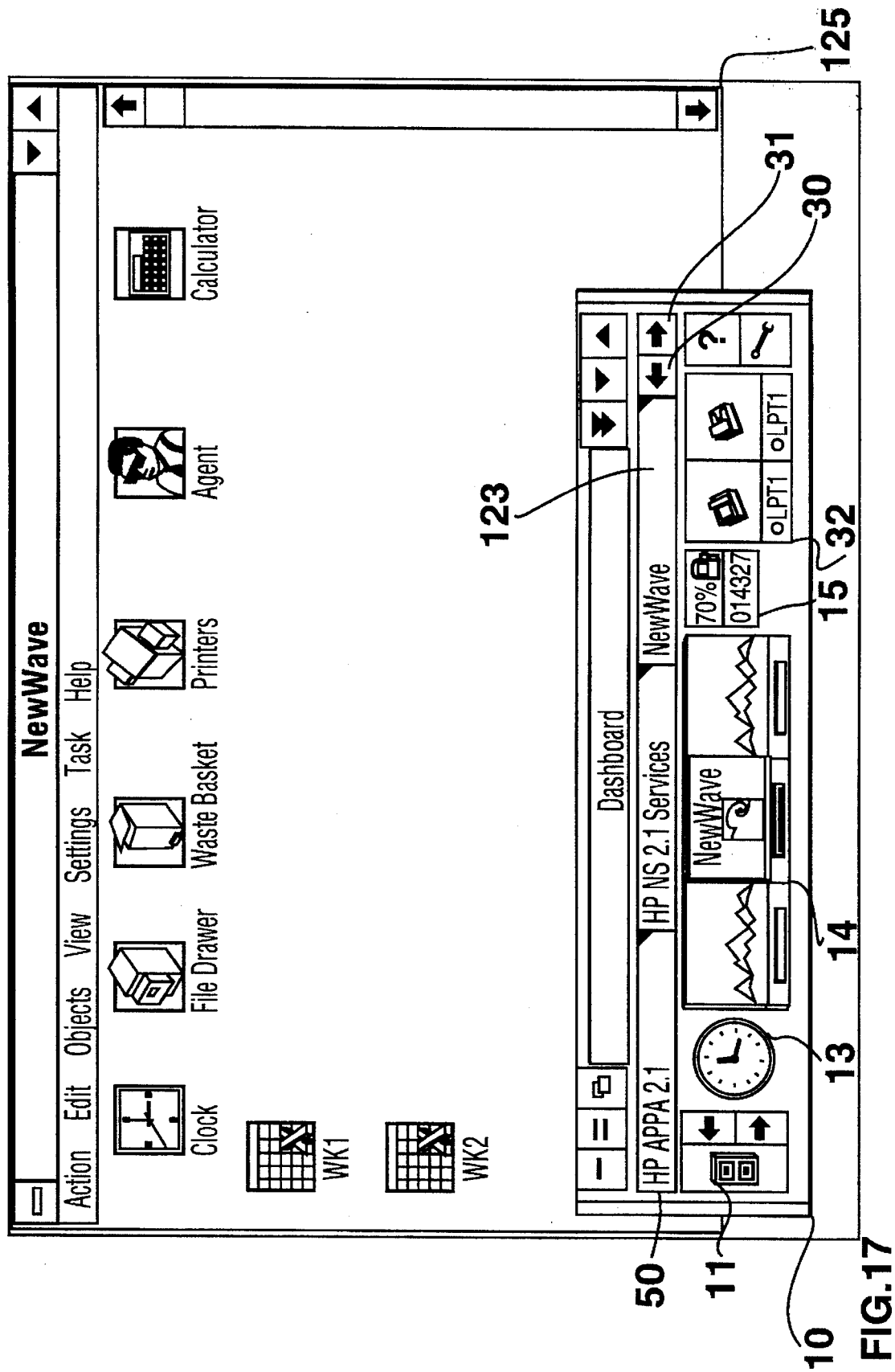
Figure 18:
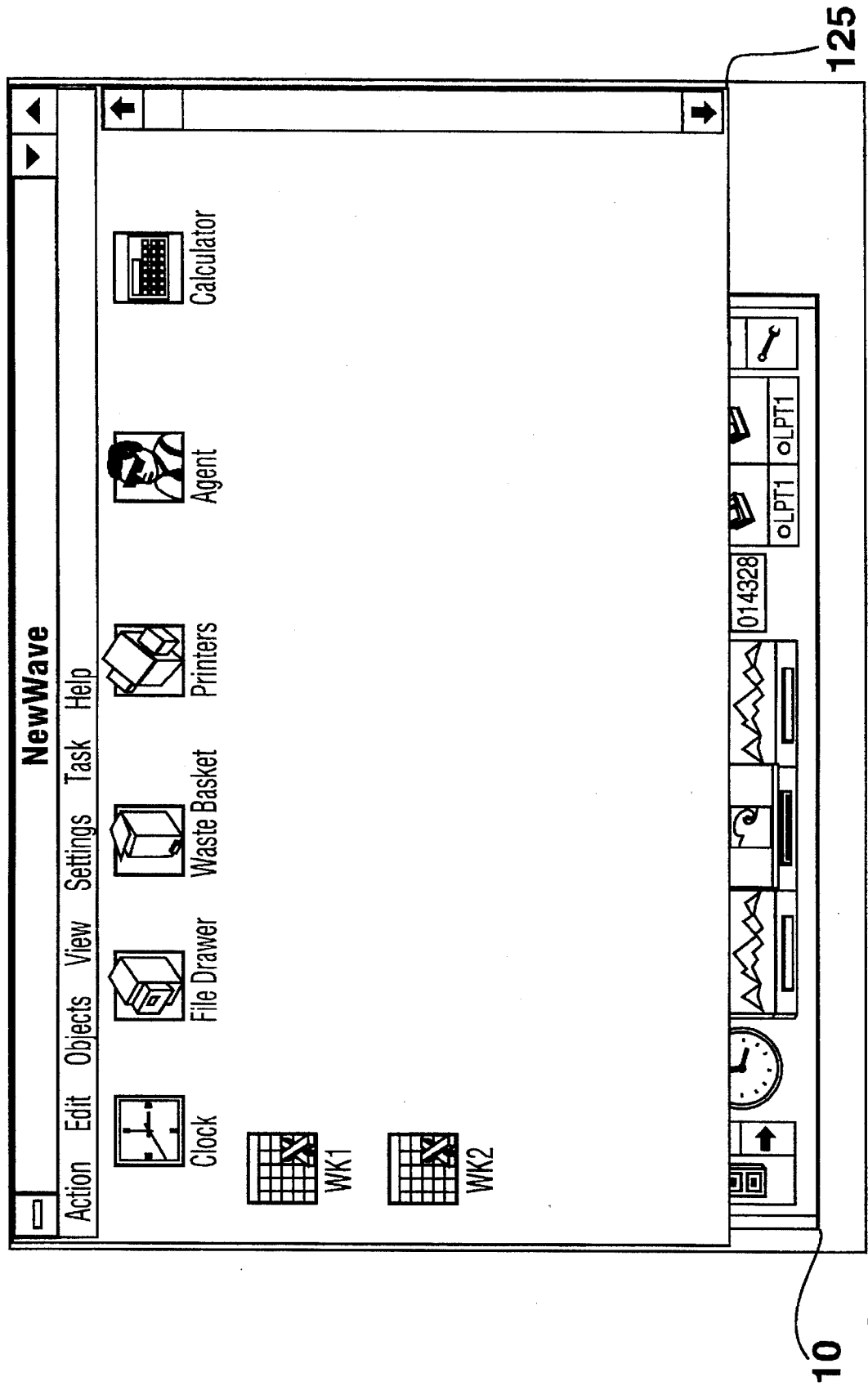

In FIG. 17, the application "NewWave" has been opened, for example by using cursor 56 and mouse 60 to scroll program menu panel 50 until NewWave button 123 appears. NewWave button 123 is then selected to launch the NewWave application, which is displayed in an application window 125. Depressing the shortcut key "F12" or simultaneously depressing mouse buttons 62 and 63 results in Dashboard interface 10 appearing in front of application window 125, as shown in FIG. 17. Then, depressing the shortcut key "F12" or simultaneously depressing mouse buttons 62 and 63 results in Dashboard interface 10 appearing in back of application window 125, as shown in FIG. 18.

Figure 19:
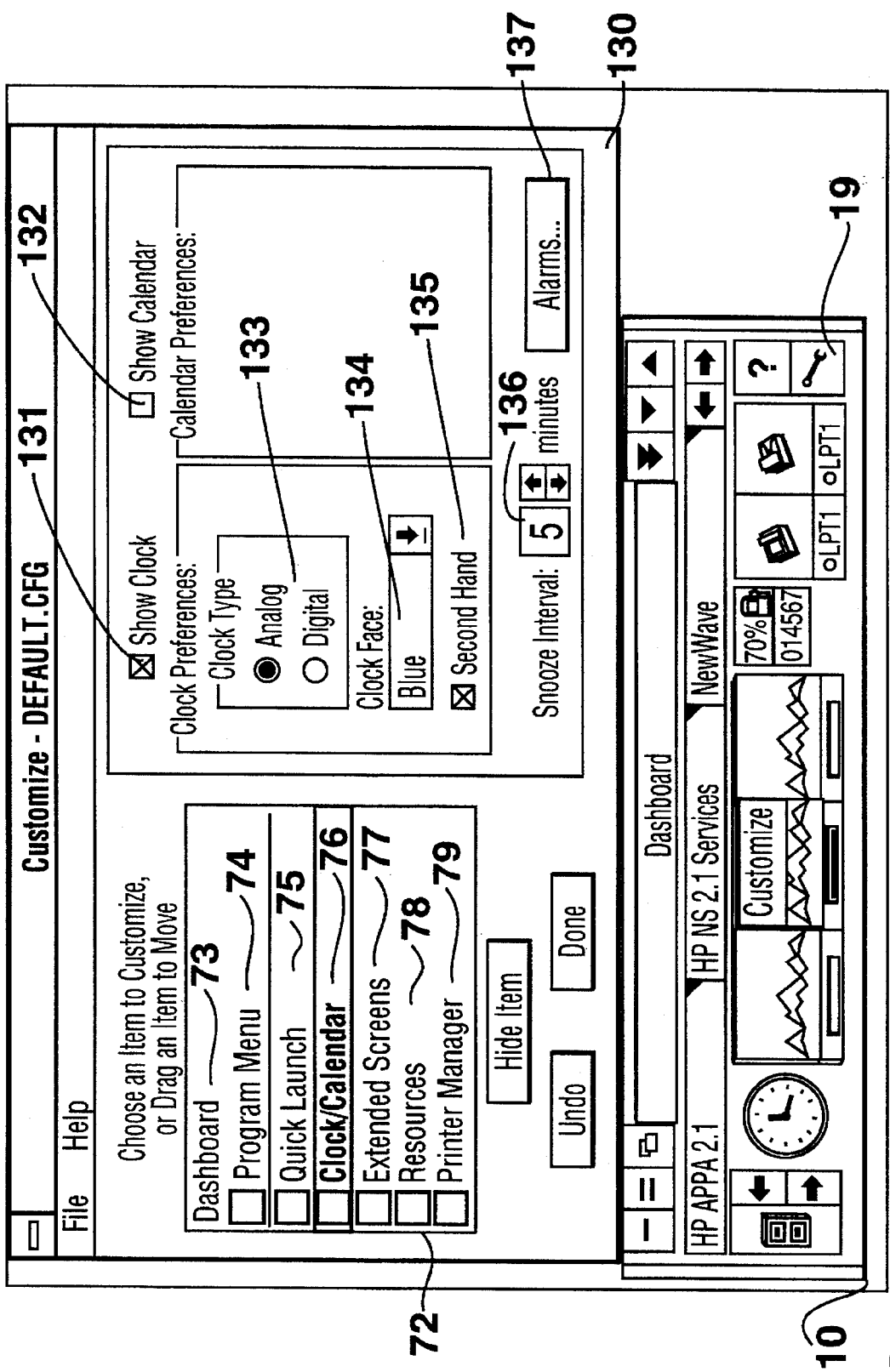

As shown by FIG. 19, cursor 56 and mouse 60 have again been used to select customize button 19 resulting in customize window 71 re-appearing. Cursor 56 and mouse 60 have then been used to select listing 76 from customize menu 72. As a result, a clock/calendar sub-window 130 appears. Sub-window 130 includes a show clock selection box 131, a show calendar selection box 132, a dock type selection box 133, a clock face selection box 134, a second hand selection box 135, a snooze interval selection box 136 and an alarms button 137.

Figure 20:
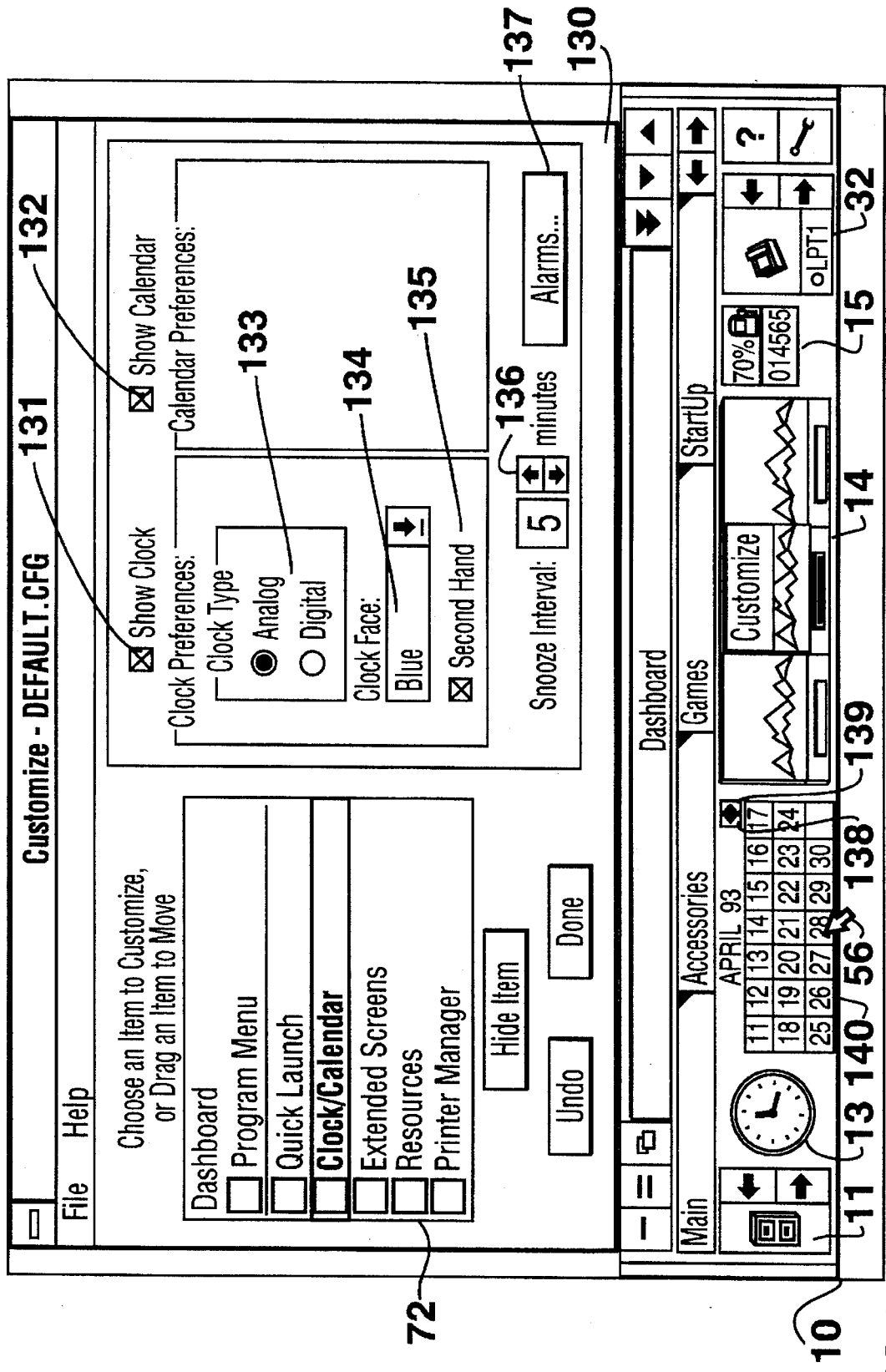

When show calendar selection box 132 is selected, a calendar 140 appears within dashboard interface 10, as shown by FIG. 20. Calendar 140 includes a scroll button 138 and a scroll button 139. These are used to scroll the calendar. On calendar 140, the current date (i.e., April 26) is highlighted.

Figure 21:
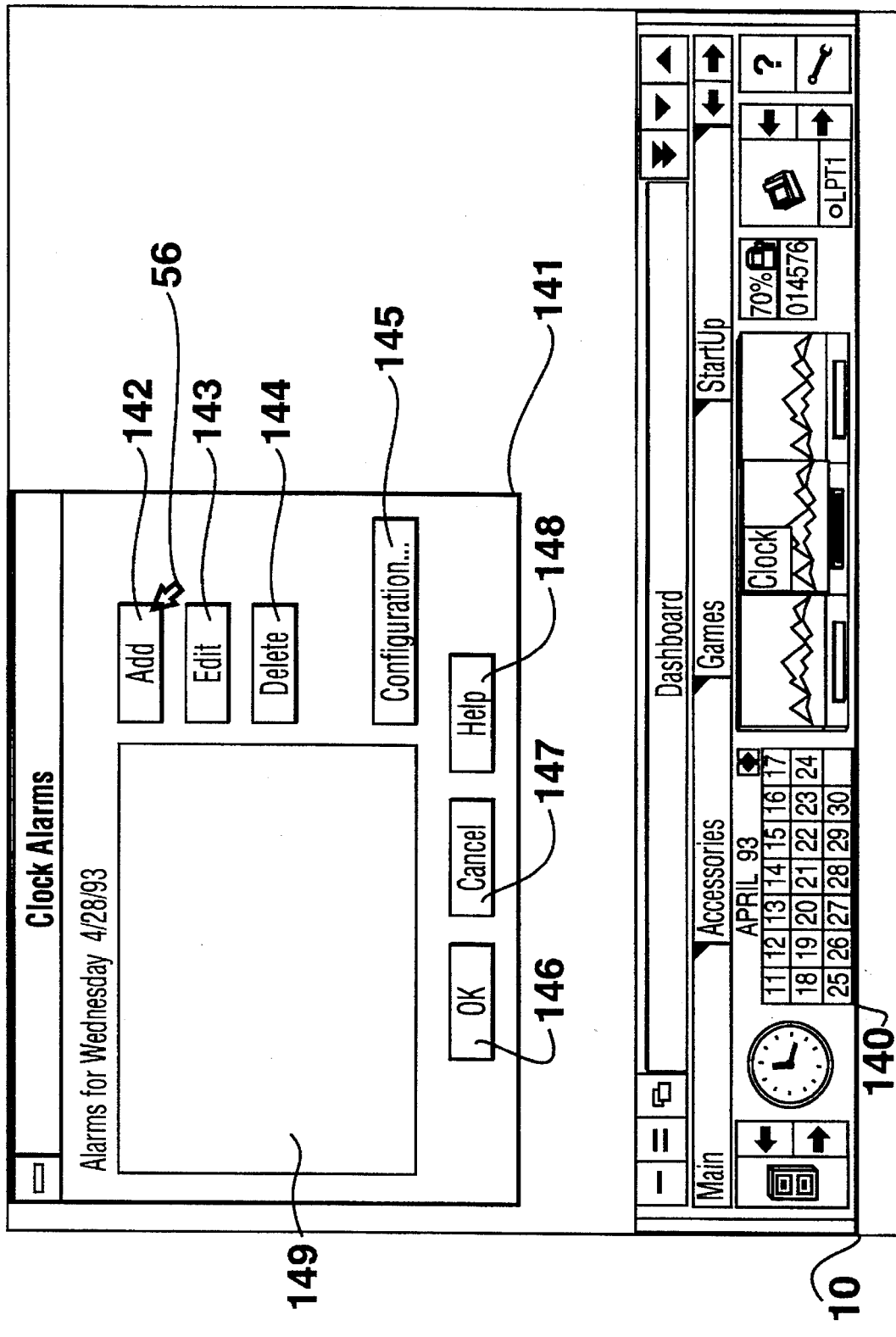

Clock Alarms can be accessed by using cursor 56 and mouse 60 to select alarms button 137. Alternately, the alarms may be accessed from calendar. For example, placing cursor 56 over the date April 28 on calendar 140 and clicking mouse button 62 twice in quick selection results in the appearance of clock alarms window 141, as shown by FIG. 21. Clock alarms window 141 includes an alarms listing 149, an add button 142, an edit button 143, a delete button 144 a configuration button 145, an OK button 146, a cancel button 147 and a help button 148.

Figure 22:
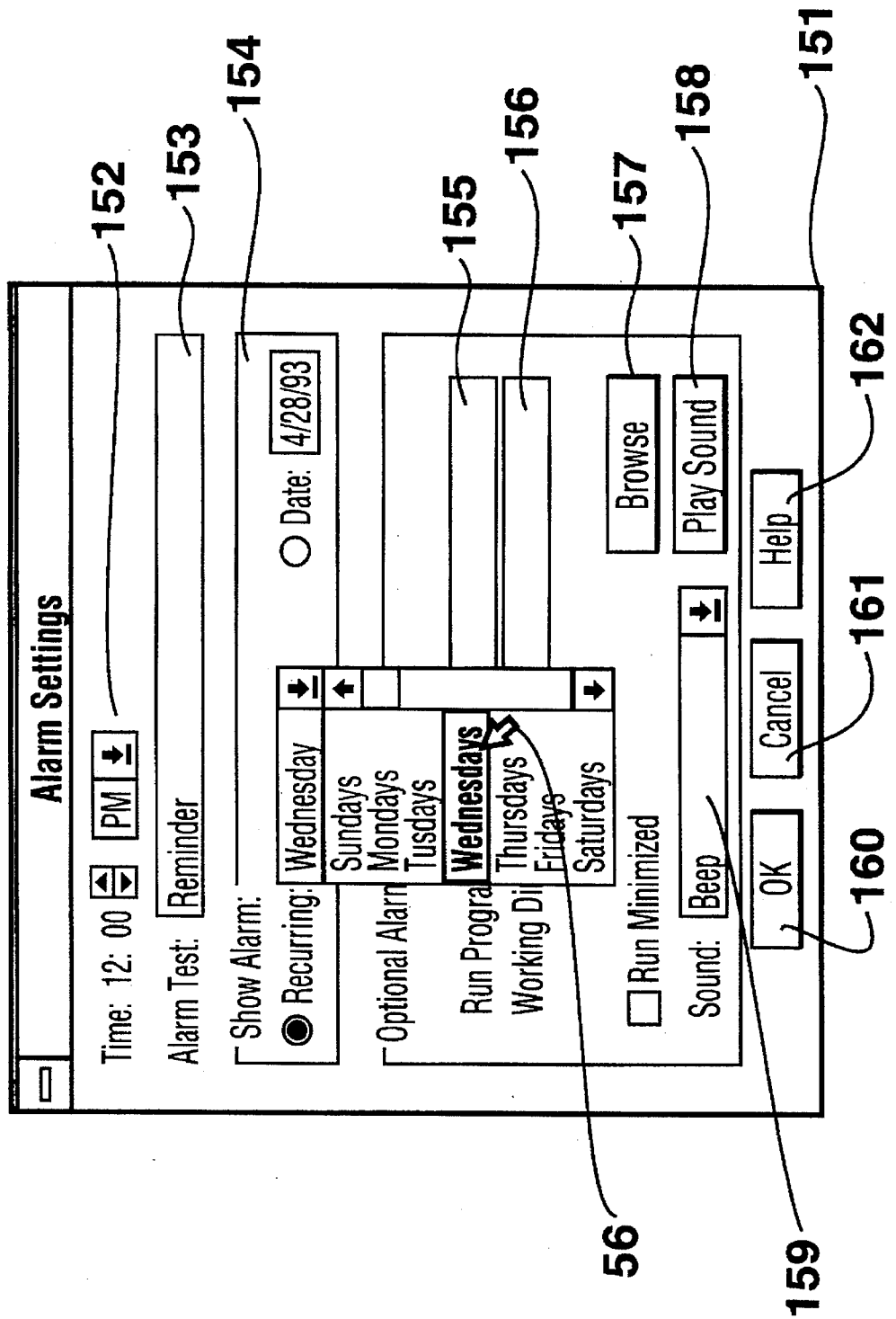

Using cursor 56 and mouse 60 to select add button 142 results in the appearance of an alarm settings window 151, as shown in FIG. 22. Alarm settings window 151 includes time setting 152, an alarm text selection box 153, a show alarm selection box 154, a run program selection box 155, a working directory selection box 156, a browse button 157, a sound selection box 159, a play sound button 158, an OK button 161, a Cancel button, and a help button 162. Using cursor 56, mouse button 62, and keyboard 69, a recurring alarm for Wednesdays at 12:00 PM, with an Alarm text of "Reminder" is set.

Figure 23:
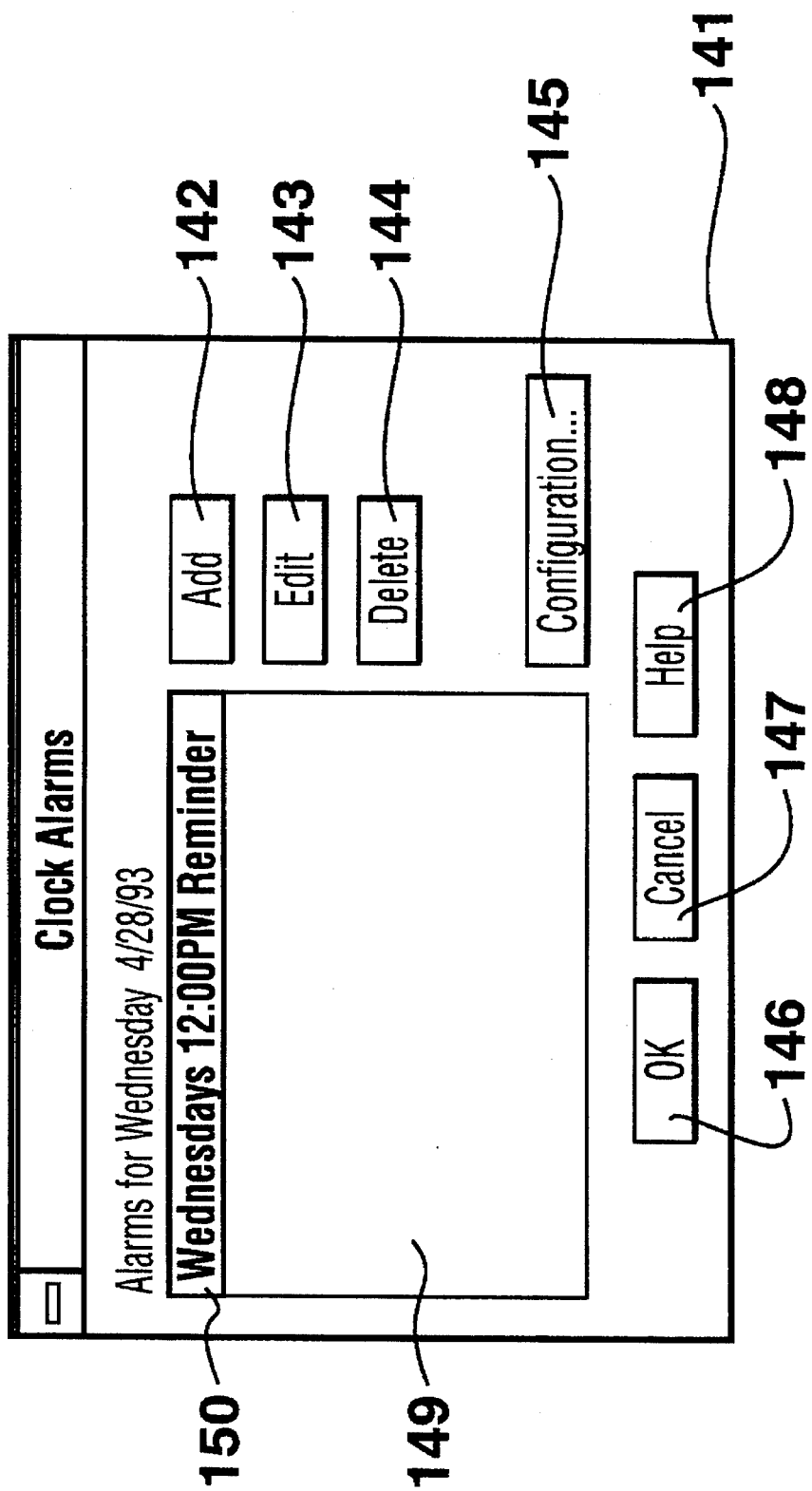
Figure 24:
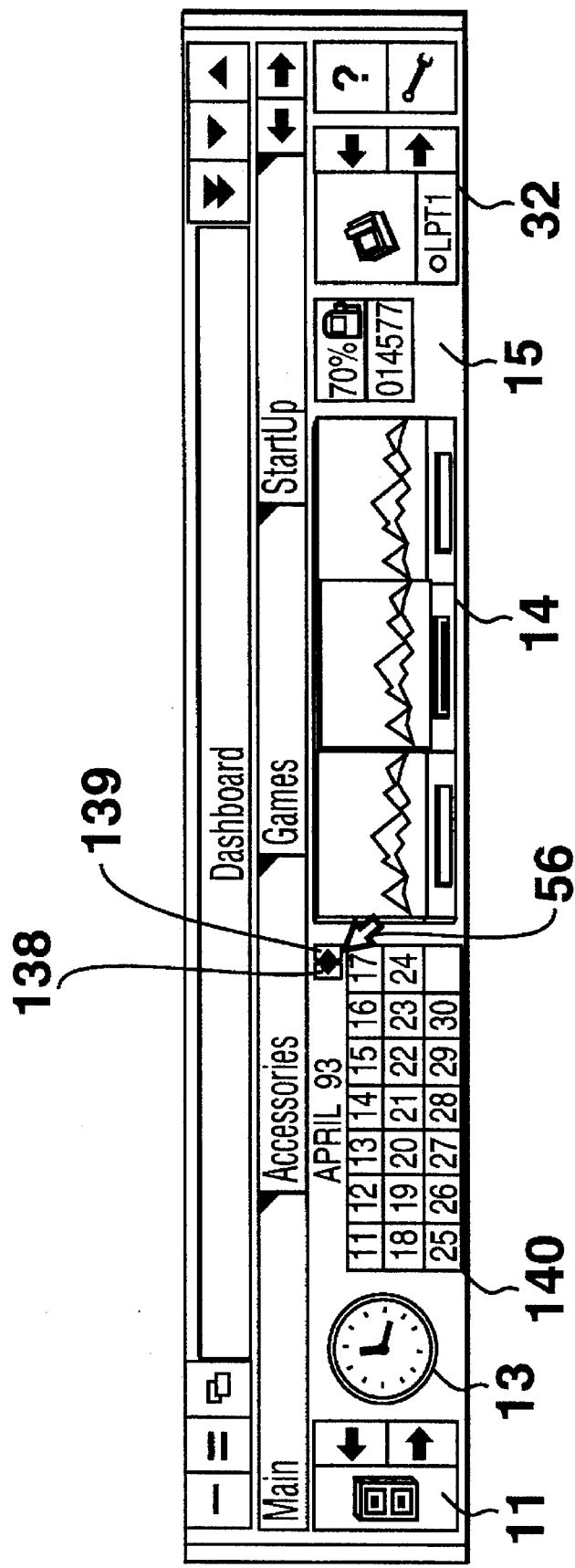

Upon selecting OK button 161, a new alarm listing 150 appears in alarms listing 149 of clock alarms window 141, as shown in FIG. 23. In calendar 140 of dashboard interface 10, entries for Wednesdays are highlighted, as shown in FIG. 24, to indicate an alarm has been set for these dates.

Figure 25:
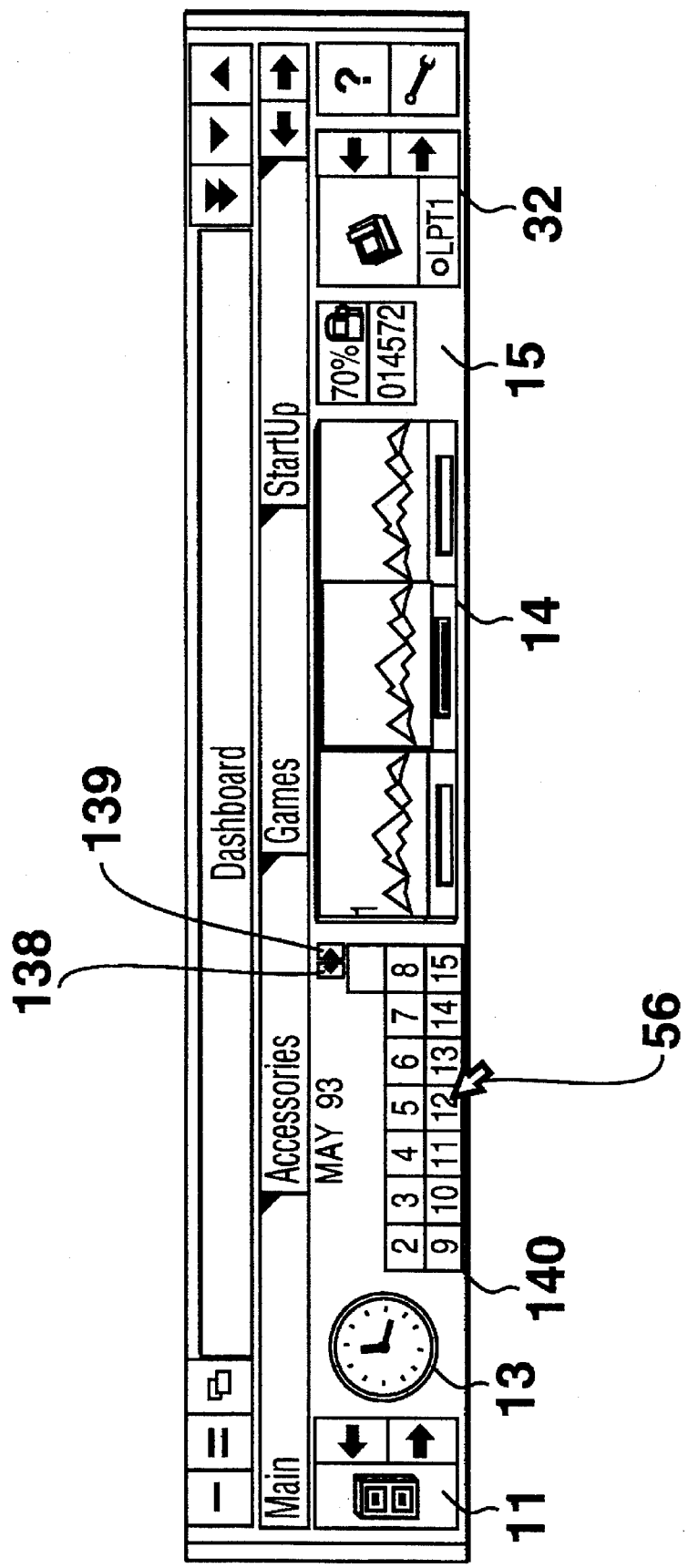
Figure 26:
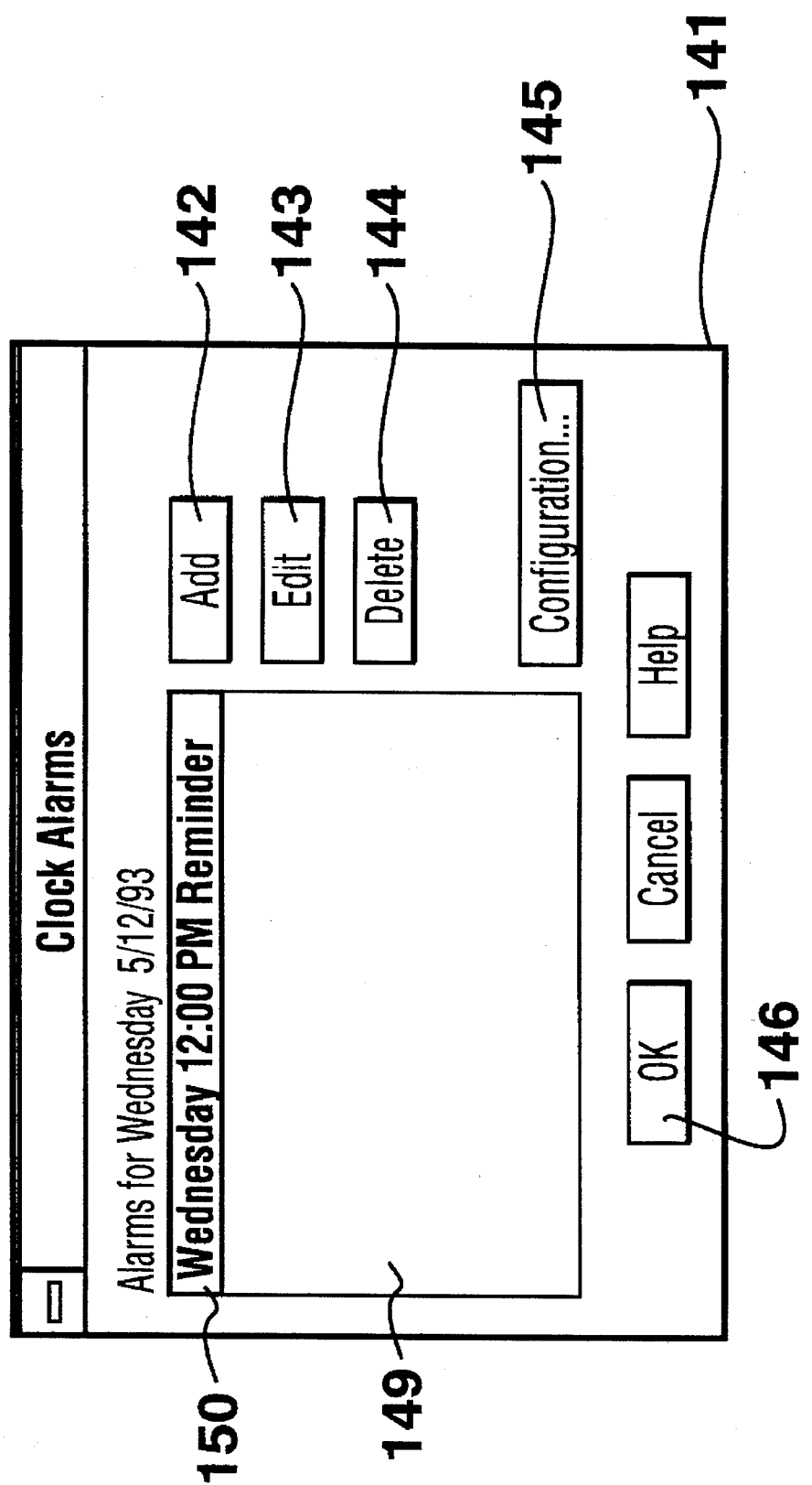

Using scroll buttons 138 and 139, the month of May is accessed. In calendar 140 of dashboard interface 10, for the month of May entries for Wednesdays are highlighted, as shown in FIG. 25, to indicate an alarm has been set for these dates. Placing cursor 56 over the date May 12 on calendar 140 and clicking mouse button 62 twice in quick selection results in the appearance of clock alarms window 141 for the date of May 12, as shown by FIG. 26. Alarm listing 150 also appears in alarms listing 149 of clock alarms window 141 for May 12.

Figure 27:
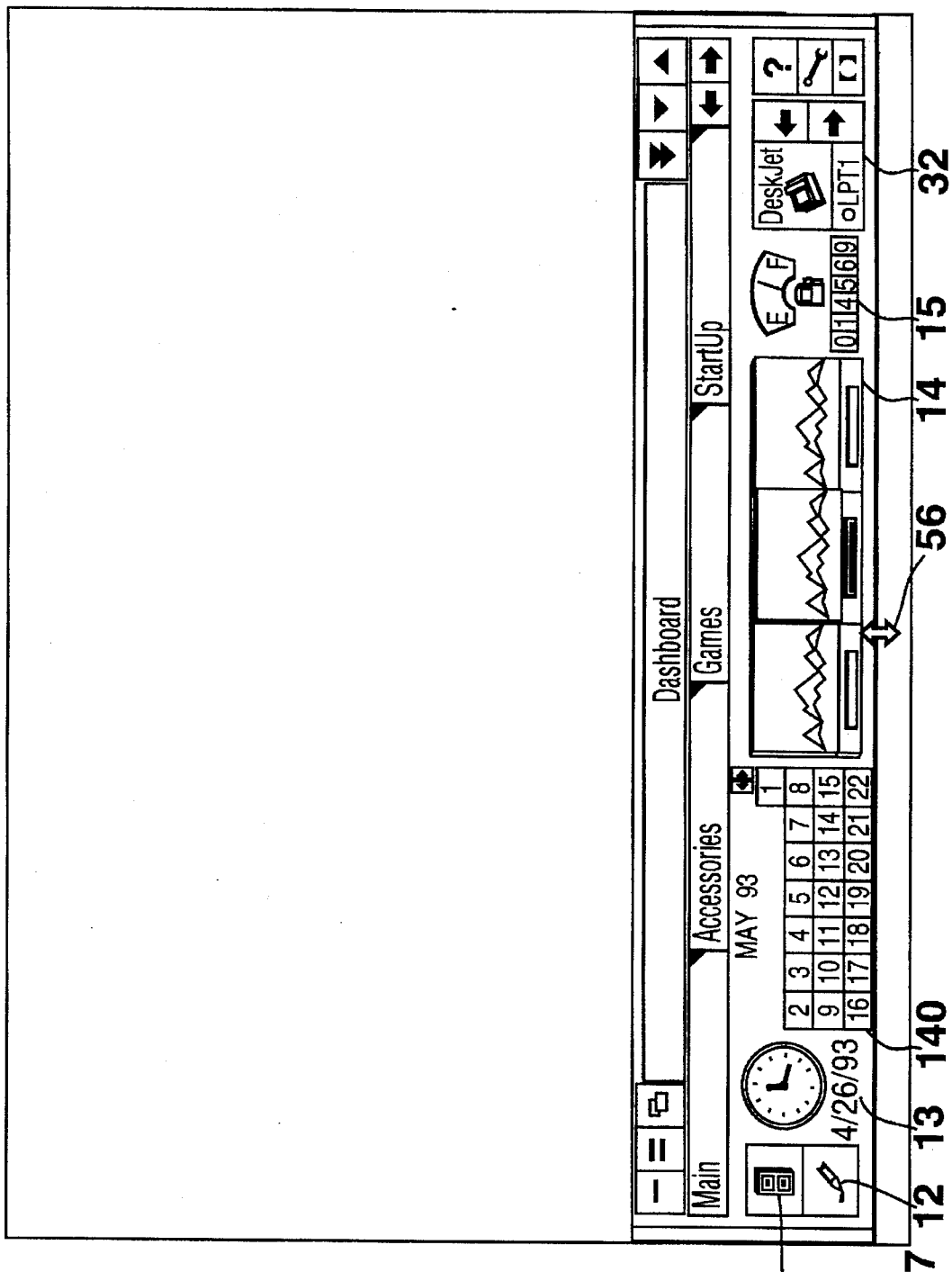

As the vertical size of dashboard interface 10 changes, rows of dates are added to or subtracted from calendar 140. For example, when cursor 56 and mouse 60 are used to increase the size of dashboard interface 10, an additional row of dates are added to calendar 140, as shown in FIG. 27.

Figure 28:
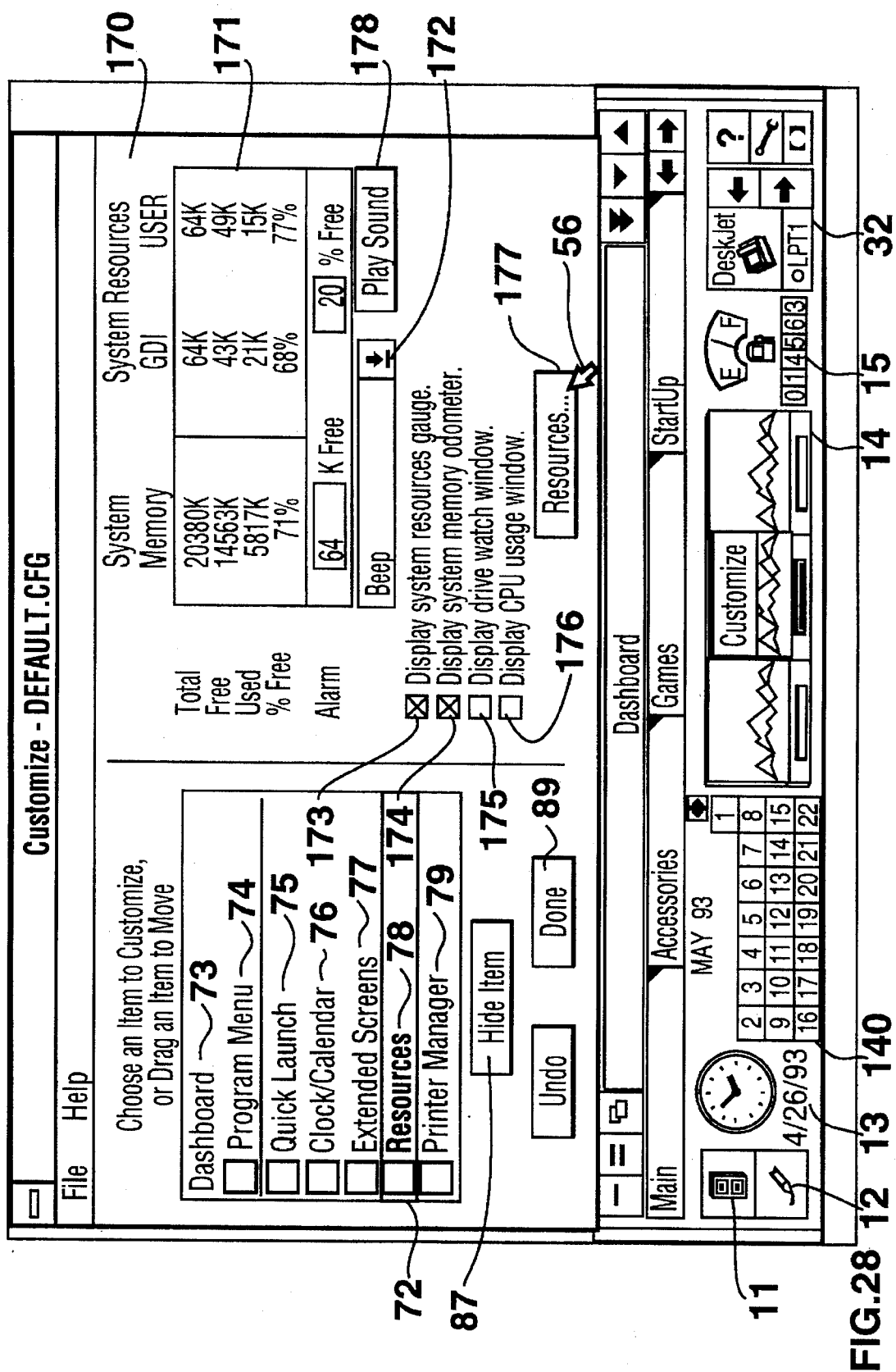
Figure 29:
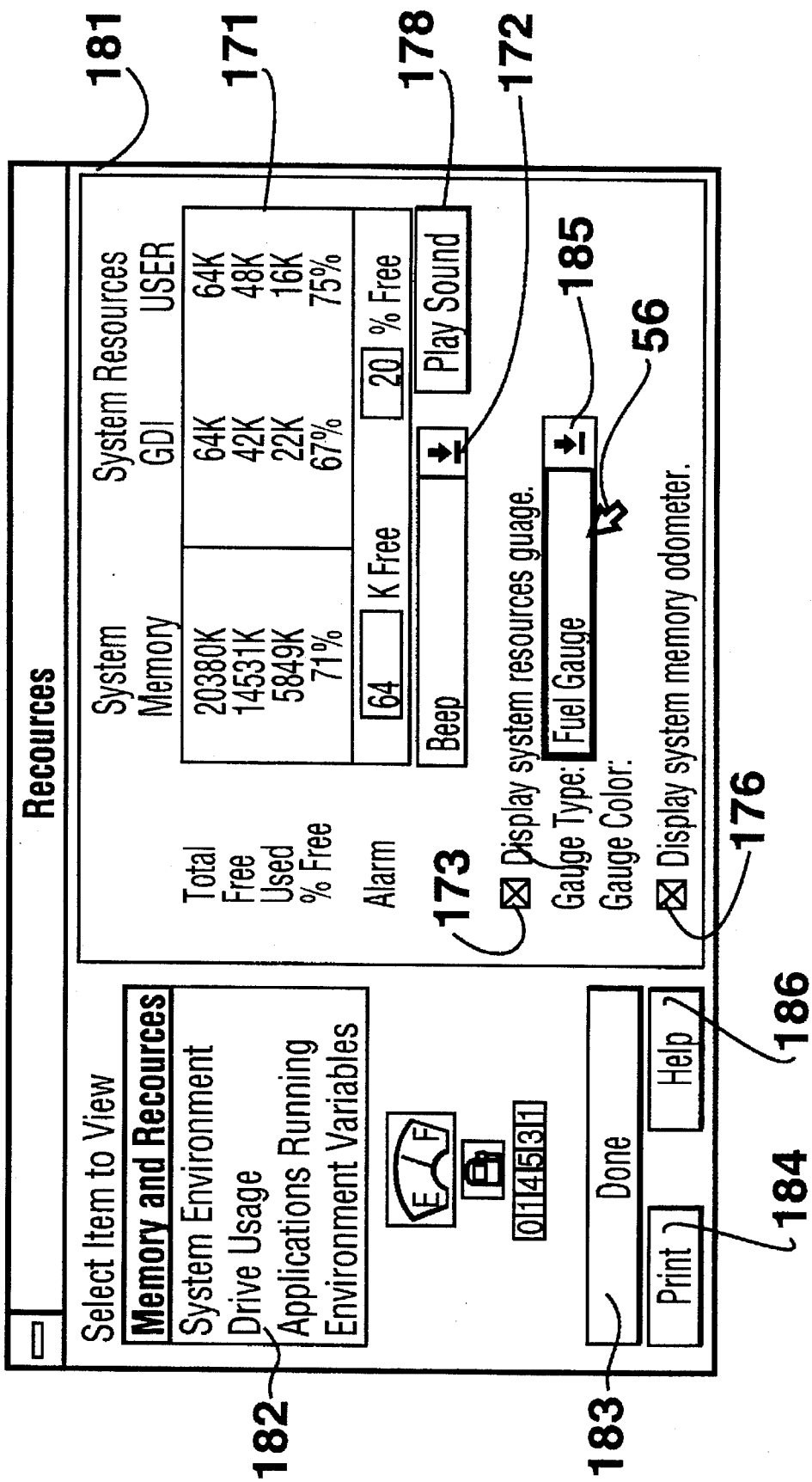

As shown by FIG. 28, cursor 56 and mouse 60 have again been used to select customize button 19 resulting in customize window 71 re-appearing. Cursor 56 and mouse 60 have then been used to select listing 78 from customize menu 72. As a result, a resources sub-window 170 appears. Sub-window 170 includes a resources display 171, a sound selection box 172, a play sound button 178, a display system resources gauge selection box 173, a display system memory odometer selection box 174, a display drive watch window selection box 175, a display CPU usage window selection box 176 and a resources button 177. In the most recent version of the present invention, CPU usage is not implemented.

Figure 30:
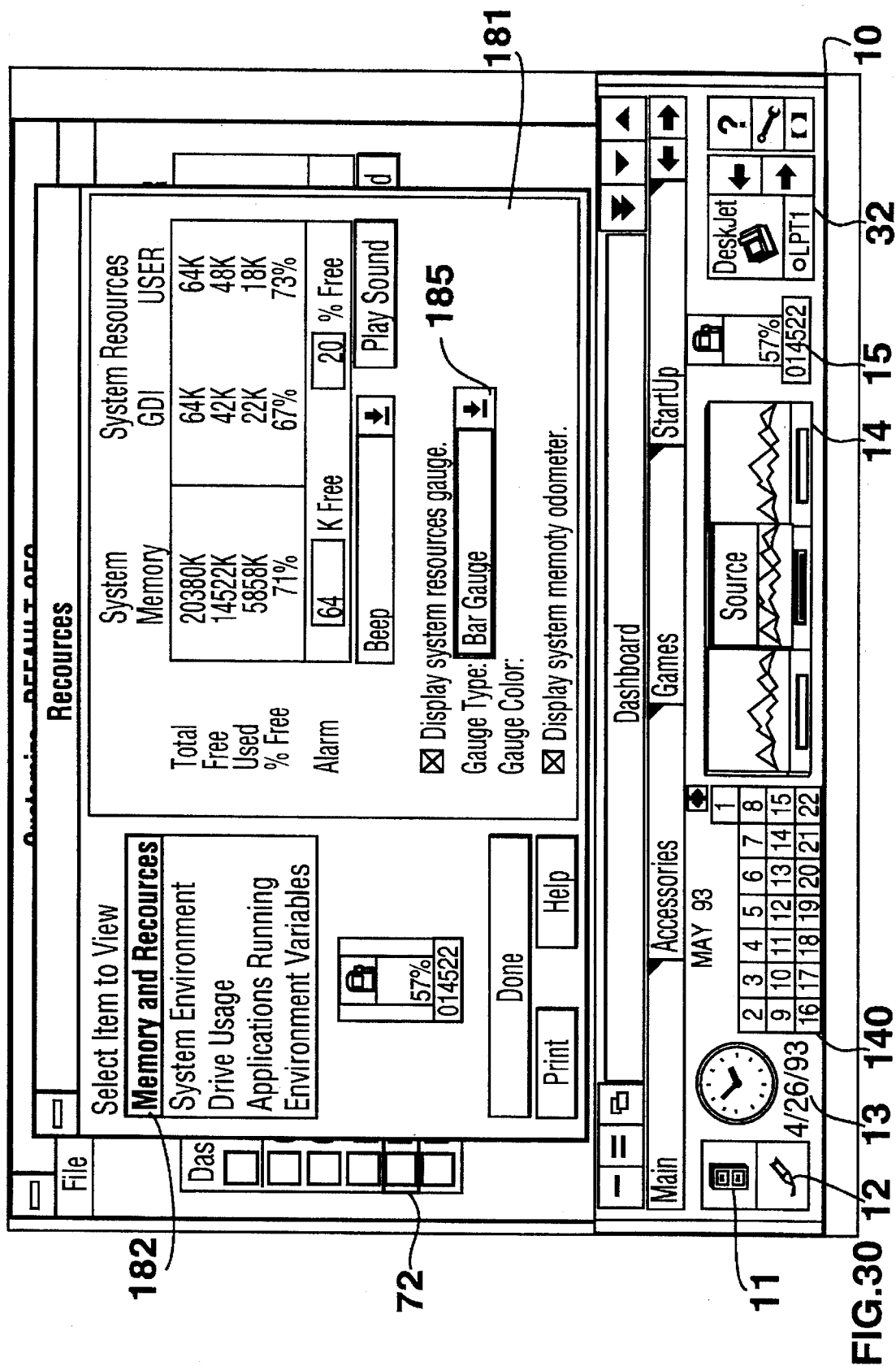
Figure 31:
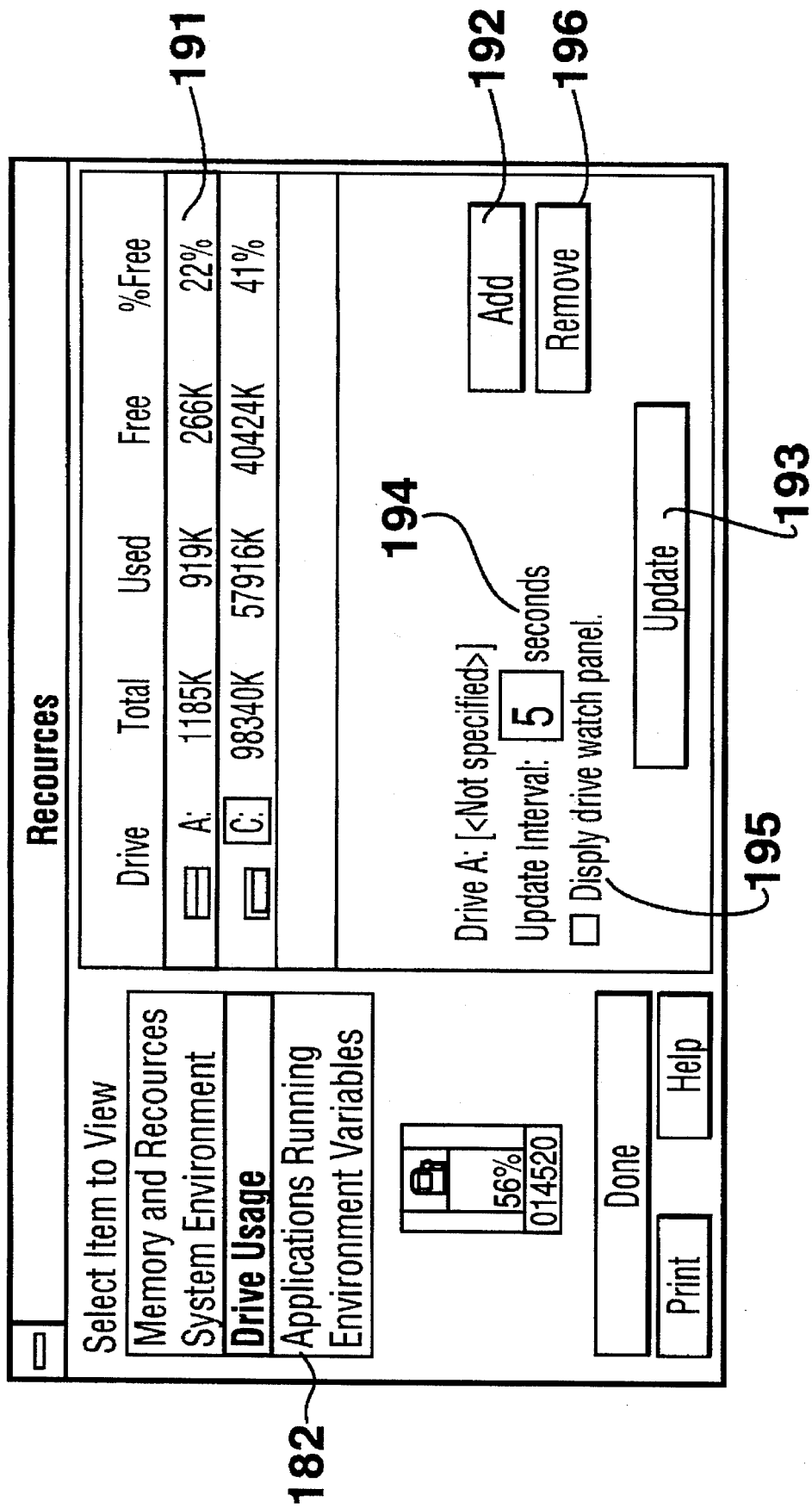
Figure 32:
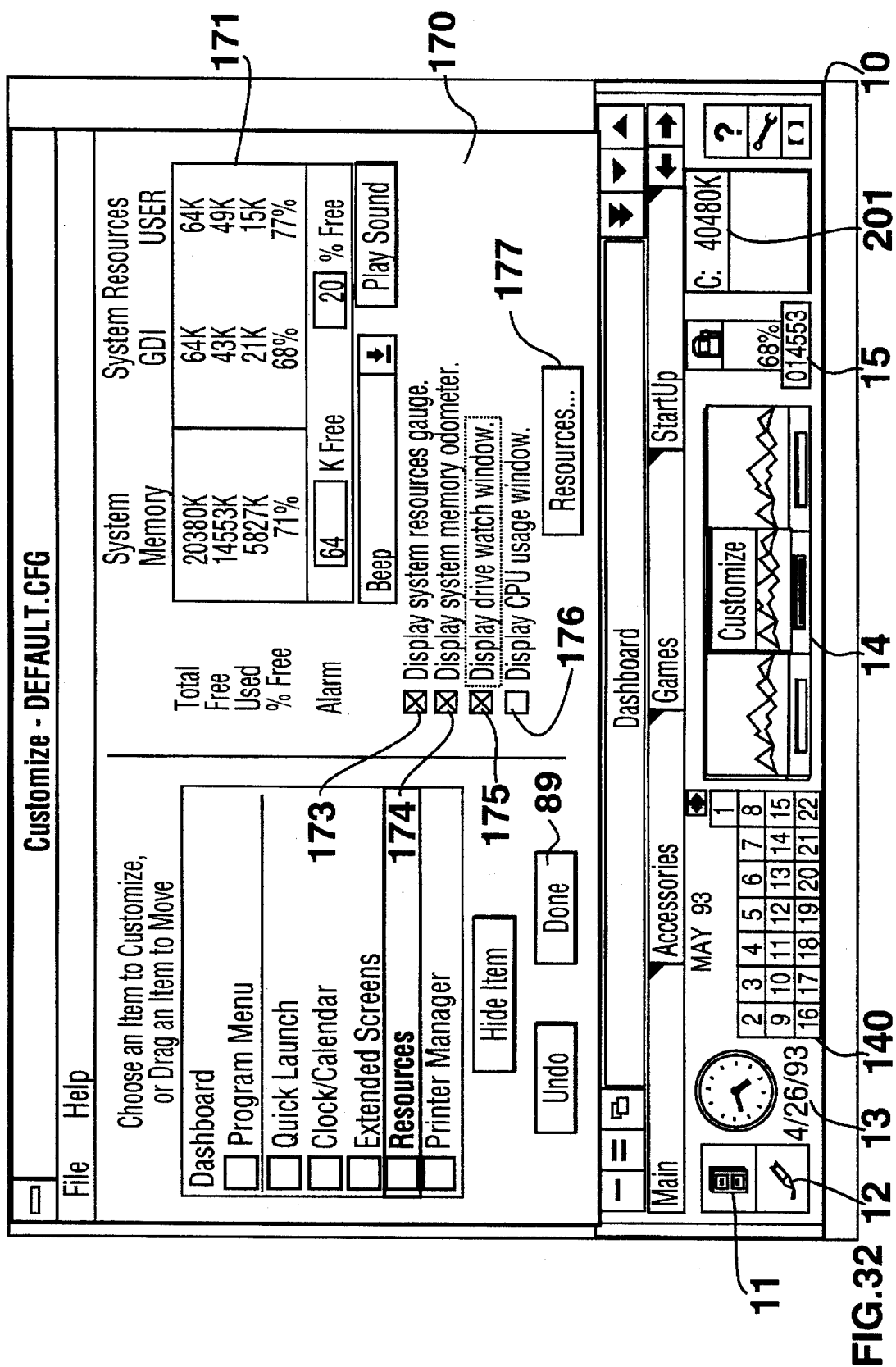

Using cursor 56 and mouse 60 to select resources button 177 results in the appearance of a resources window 181. Resources window includes resources display 171, sound selection box 172, play sound button 178, display system resources gauge selection box 173, display system memory odometer selection box 174, an item selection box 182, a "Done" button 183, a "Print" button 184, a "Help" button 16, and a gauge type selection box 184. When gauge type is change from "Fuel Gauge" to "Bar gauge", the display on resource panel 15 changes to display a bar gauge, as shown in FIG. 30. When "Drive Usage" is selected from item selection box 182, a drive selection listing 191, an update interval selection box 194, an add button 192, a remove button 196, and an update button 193 are displayed, as shown by FIG. 31. When display drive watch window selection box 175 from resources sub-window 170 is selected, a drive watch display 201 appears within dashboard interface 10, as shown by FIG. 32.

Figure 33:
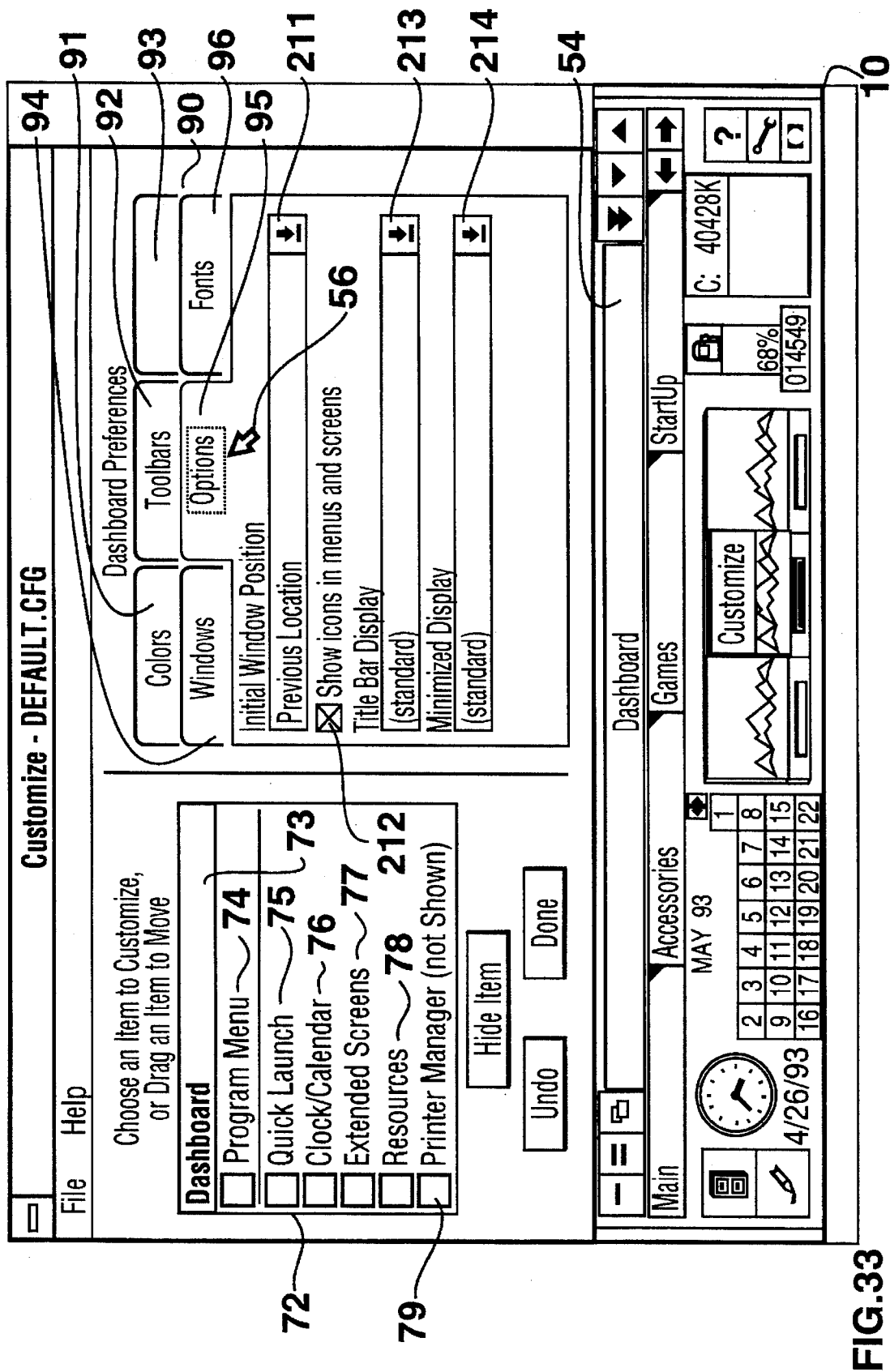
Figure 34:
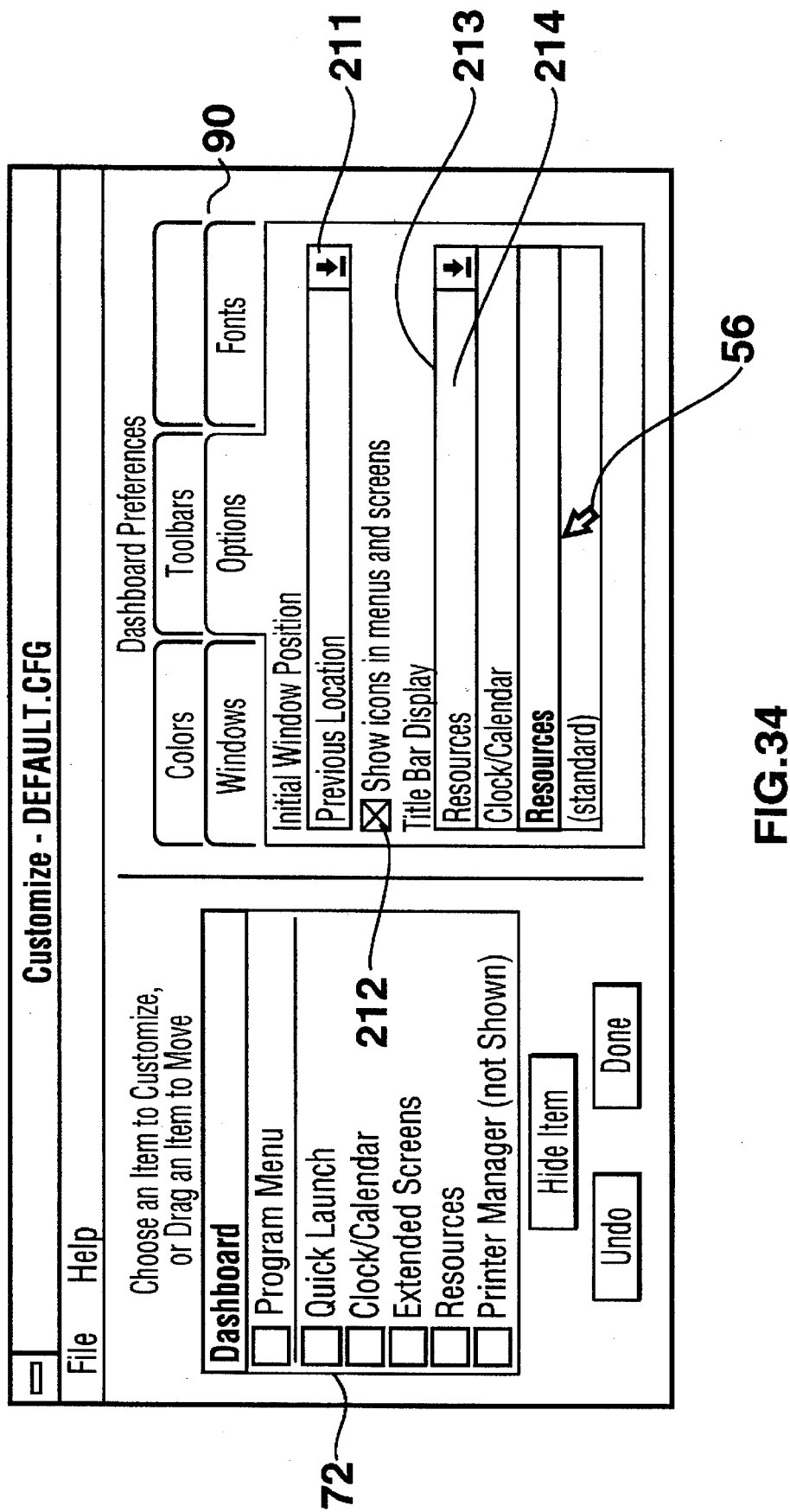
Figure 35:
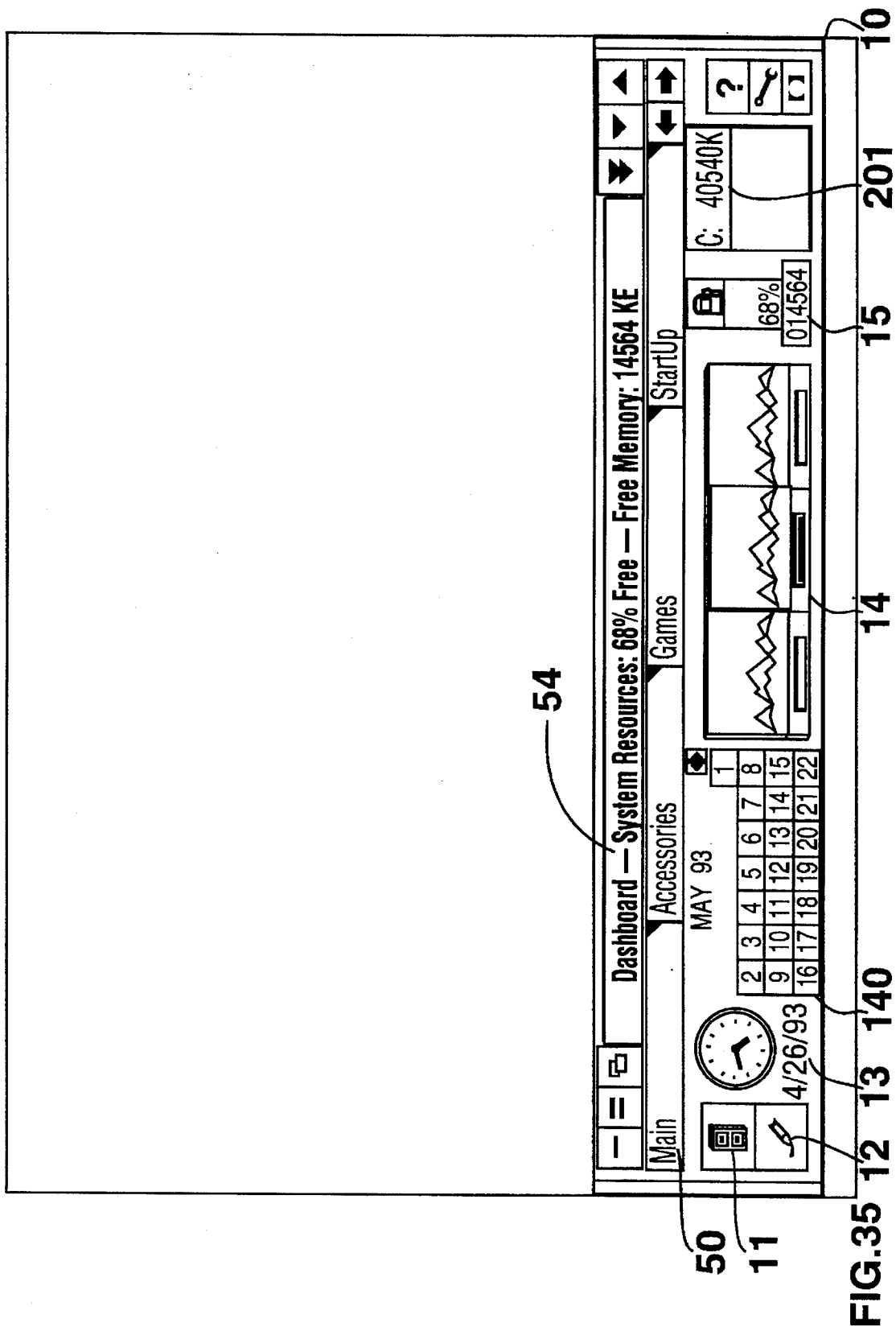
Figure 36:
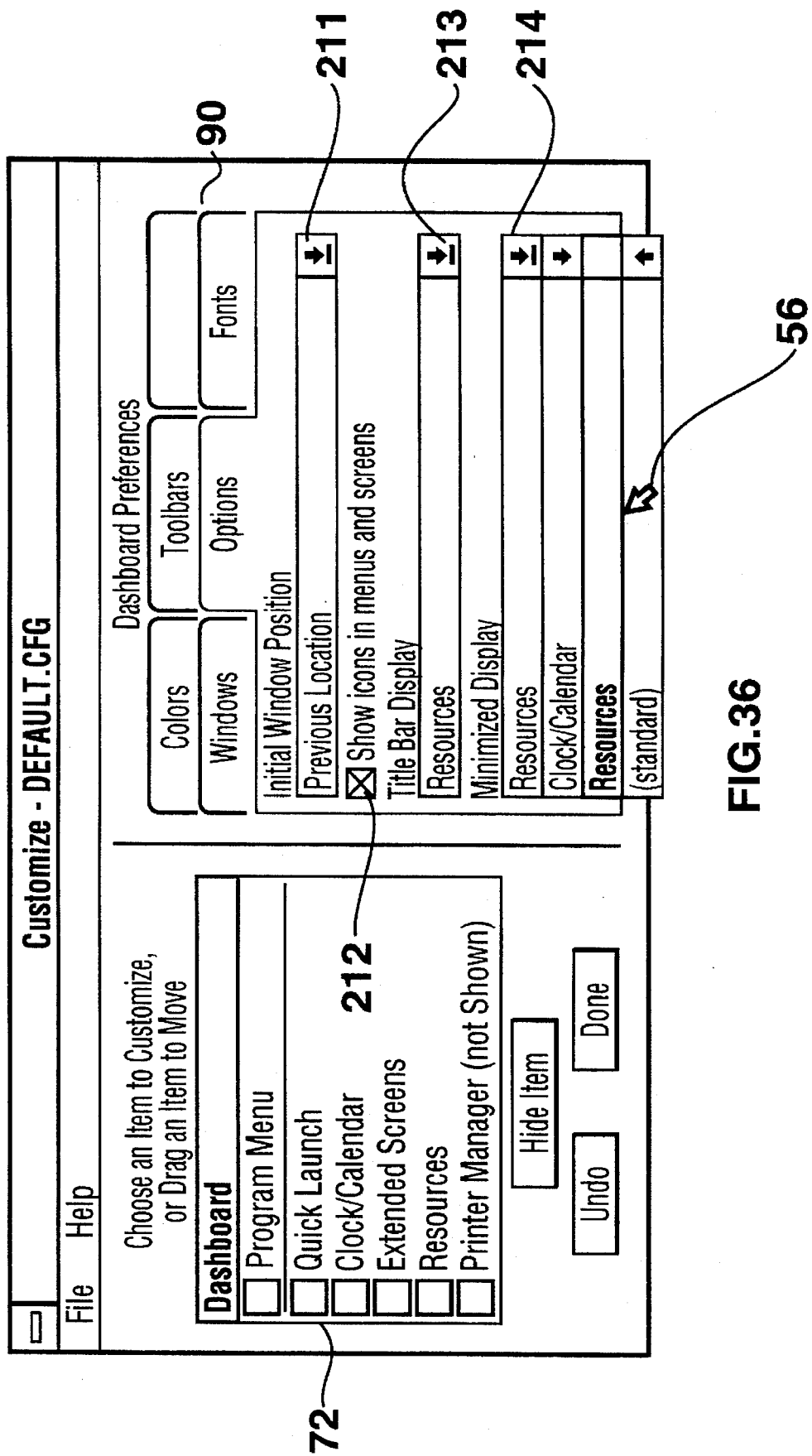
Figure 37:
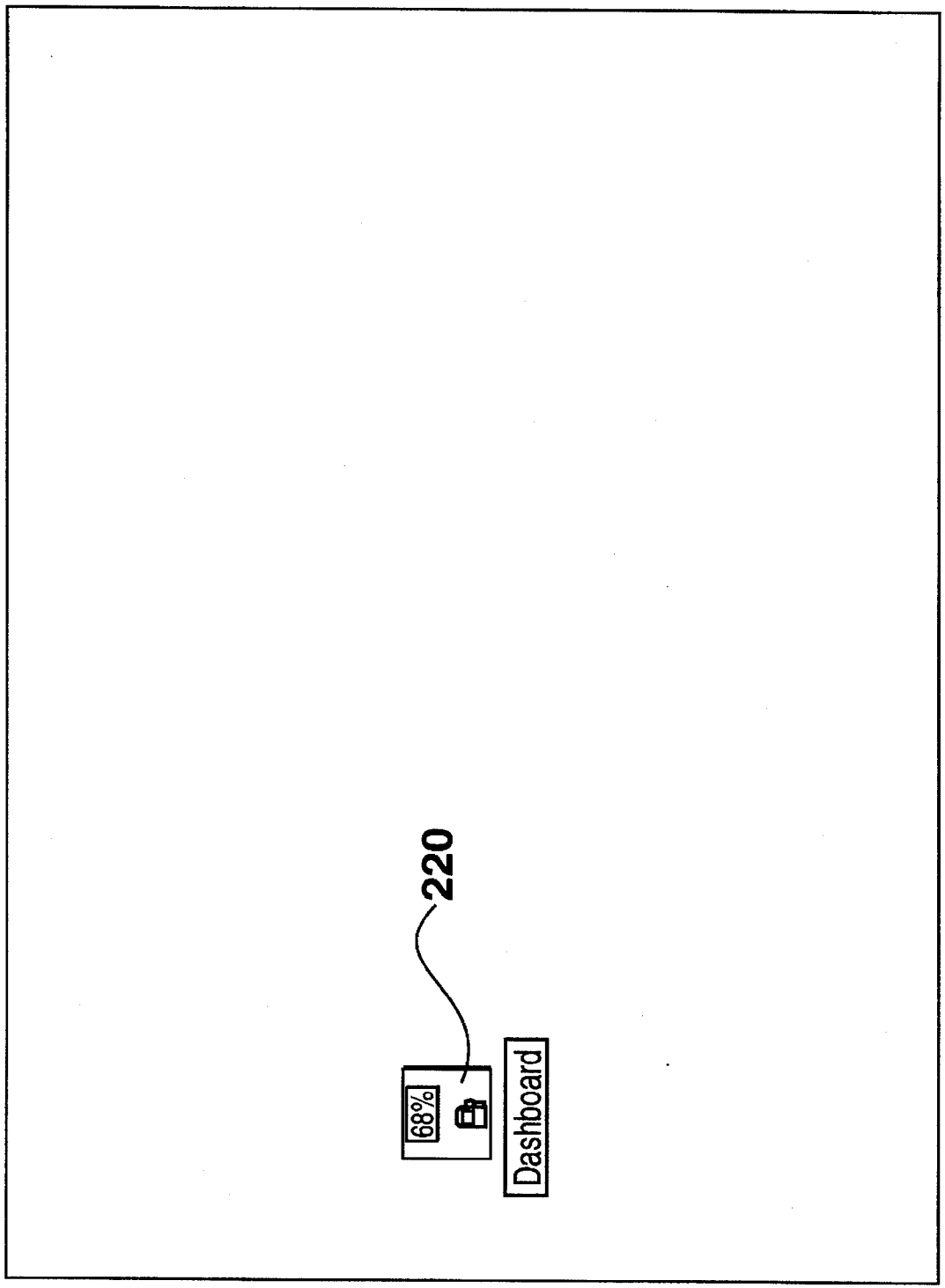

There are various additional ways in which the resources of the computing system may be displayed using dashboard interface 10. For example, selecting dashboard listing 73 and then selecting option tab 95 results in the display shown in FIG. 33. The displayed window includes an initial window position selection box 211, a show icons selection box 212, a title bar display selection box 213 and a minimized display selection box 214. As shown by FIG. 34, cursor 56 and mouse 60 may be used to select "Resources" from title bar display selection box 213. As shown by FIG. 35, this results in resource information appearing within rifle bar 54 of dashboard interface 10. Likewise, as shown by FIG. 36, cursor 56 and mouse 60 may be used to select "Resources" from minimized display selection box 214. As shown by FIG. 37, this results in resource information appearing within a minimized display icon 220 for dashboard interface 10 when dashboard interface 10 is minimized.

Appendix A includes fie source listing of modules which implement various portions of the present invention. The included Source modules are the Resource Gauge Panel (GAUGE2), DASH.C, DBCONFIG.C, DBLIB.C, DLHOTKEY.C, DLROLODX. C and DBAPPS.C. The Resource Panel Gauge shows software implementation of the system resource fuel gauge and the system resources bar gauge. Source code implementing the hotkey/mouse shortcuts are found in the modules DASH.C, DBAPPS.C, DBCONFIG.C and DLHOTKEY. C. Source code implementing the quick launch icons are found in the module DBAPPS.C. Source code implementing the rollodex feature are found in the modules DBCONFIG.C and DLROLODX.C. Source code implementing the horizontal and vertical orientation and dash Sizing are found in the modules DASH.C, DBAPPS.C, DBCONFIG.C and DBLIB.C. Source code implementing the individual panel sizing are found in the modules DASH.C, DBAPPS.C and DBLIB.C.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. In a computer system, a computer implemented method for providing a user interface, the method comprising the steps of:

(a) displaying, by a main module process of the user interface, a user interface graphic display shell, said graphic display shell being continually displayed on top of any other application programs executing on said computer system, said graphic display shell being displayed along a horizontal side of said user interface so as to allow display of any application programs executing on said computer system;

(b) displaying, by a plurality of application program panel modules processes, a plurality of application program panel displays integrated into the user interface graphic display shell, each application program panel module process displaying a single application program panel display wherein the plurality of application program panel displays are displayed in a horizontal row within graphic boundaries of the user interface graphic display shell, each application program panel display being associated with a particular group of application programs for execution on said computer system;

(c) displaying at least one resource panel display which is also integrated into the user interface graphic display shell, each at least one resource panel display representing a resource in the computer system other than an application program, wherein each said at least one resource panel display is displayed within graphic boundaries of the user interface graphic display shell at a screen region which maintains a user-specified position relative to said horizontal row of application program panel displays;

(d) in response to a first user input for selecting a desired one of said plurality of application program panel displays, displaying a list of the group of application programs associated with said desired application program panel display which has been selected;

(e) in response to a second user input for selecting a desired program for execution from said group of application programs being displayed in step (d), launching execution of said desired application program; and (f) in response to a third user input for repositioning said graphic display shell along a vertical side of said user interface, automatically reconfiguring display of said plurality of application program panel modules and said at least one resource panel display,. so that said plurality of application program panel displays is displayed in a vertical row within graphic boundaries of the user interface graphic display shell and so that Said at least one resource panel display is displayed within graphic boundaries of the user interface graphic display shell at a screen region which maintains a user-specified position relative to said vertical row of application program panel displays.

2. The method of claim 1, further comprising:
receiving fourth user input for resizing said user interface graphic display shell in a single dimension; and
in response to said fourth user input, automatically resizing at least some of the application program panel displays in said single dimension.

3. The method of claim 2, further comprising:
in response to said fourth user input, automatically removing at least some of the application program panel displays from display.

4. The method of claim 2, wherein said fourth user input includes user input from a mouse device.

5. The method of claim 2, wherein said single dimension comprises a selected one of a horizontal dimension and a vertical dimension.

6. The method of claim 2, further comprising:
receiving fifth user input for resizing said user interface graphic display shell in another single dimension; and
in response to said fifth user input, automatically resizing at least some of the application program panel displays in said another single dimension.

7. The method of claim 2, wherein said resizing includes a selected one of shrinking and expanding said user interface graphic display shell.

* * * * *